United States Patent
Hamel et al.

(10) Patent No.: US 9,058,326 B1
(45) Date of Patent: Jun. 16, 2015

(54) RECOVERY AND FLUSH OF ENDURANT CACHE

(75) Inventors: Alain Hamel, North Bend, WA (US); John Benjamin Brazel, Seattle, WA (US); Justin Michael Husted, Seattle, WA (US); Max Laier, Seattle, WA (US)

(73) Assignee: EMC CORPORATION, Hopkinton, MA (US)

( * ) Notice: Subject to any disclaimer, the term of this patent is extended or adjusted under 35 U.S.C. 154(b) by 167 days.

(21) Appl. No.: 13/539,082

(22) Filed: Jun. 29, 2012

(51) Int. Cl.
G06F 17/30 (2006.01)

(52) U.S. Cl.
CPC .... G06F 17/30008 (2013.01); G06F 17/30581 (2013.01)

(58) Field of Classification Search
CPC .............. G06F 17/30; G06F 17/30008; G06F 17/30581; G06F 11/1471; G06F 11/1446; G06F 11/1461; G06F 11/1456; G06F 11/2082; G06F 11/2064; G06F 11/2074; G06F 11/2023; G06F 11/2058; G06F 12/0804; G06F 12/0866; G06F 12/0888; G06F 12/0897; H04L 67/1095; H04L 67/2842; H04L 69/40; Y10S 707/99953
USPC ................. 707/703, 640, 661, 674, 648, 695; 709/201; 711/162
See application file for complete search history.

(56) References Cited

U.S. PATENT DOCUMENTS

| | | | |
|---|---|---|---|
| 5,546,536 A * | 8/1996 | Davis et al. ...................... | 714/20 |
| 6,131,094 A | 10/2000 | Gord | |
| 7,653,668 B1 | 1/2010 | Shelat et al. | |
| 7,673,099 B1 * | 3/2010 | Beaverson et al. ........... | 711/118 |
| 7,752,402 B2 | 7/2010 | Fachan et al. | |
| 8,019,771 B2 | 9/2011 | Iwao | |
| 8,055,711 B2 | 11/2011 | Fachan et al. | |
| 8,666,991 B2 | 3/2014 | Peters et al. | |
| 8,677,055 B2 | 3/2014 | Ouye et al. | |
| 8,683,257 B2 | 3/2014 | Morosan et al. | |
| 8,688,507 B2 | 4/2014 | Kennis et al. | |
| 8,688,516 B2 | 4/2014 | Shimizu et al. | |
| 2006/0041602 A1 * | 2/2006 | Lomet et al. ................... | 707/201 |
| 2007/0195692 A1 * | 8/2007 | Hagglund et al. ............ | 370/216 |
| 2008/0120470 A1 * | 5/2008 | Dhamankar et al. .......... | 711/135 |
| 2008/0228834 A1 * | 9/2008 | Burchall et al. ............... | 707/202 |
| 2009/0031097 A1 * | 1/2009 | Nelson .......................... | 711/162 |
| 2010/0122053 A1 * | 5/2010 | Prahlad et al. ................ | 711/162 |

(Continued)

OTHER PUBLICATIONS

Official Communication in U.S. Appl. No. 13/538,921 mailed Mar. 12, 2013.

(Continued)

*Primary Examiner* — Dennis Truong
(74) *Attorney, Agent, or Firm* — Sean M. Evans; Jason A. Reyes; Krishnendu Gupta

(57) ABSTRACT

Various embodiments are directed towards enabling data writes utilizing a node cache and a logstore stored on a stable storage device. A client device may send data to a node for writing to a parent file. The node may cache the received data prior to writing the data to the parent file. Caching the received data may comprise adding the received data to a node cache and to a logstore. In one embodiment, the node cache may include a coalescer that combines data from a plurality of data writes from the client device to the node prior to writing to the parent file. In some embodiments, the logstore may be mirrored logstore on one or more stable storage devices. The parent file may periodically be updated from the node cache data. After the parent file is updated, the node cache data and the logstore data may be purged.

28 Claims, 18 Drawing Sheets

(56) References Cited

U.S. PATENT DOCUMENTS

| | | | |
|---|---|---|---|
| 2011/0138123 A1* | 6/2011 | Gurajada et al. | 711/118 |
| 2011/0307736 A1* | 12/2011 | George et al. | 714/6.2 |
| 2012/0011106 A1* | 1/2012 | Reid et al. | 707/695 |
| 2012/0017037 A1* | 1/2012 | Riddle et al. | 711/103 |
| 2012/0158650 A1* | 6/2012 | Andre et al. | 707/611 |
| 2012/0210066 A1* | 8/2012 | Joshi et al. | 711/118 |
| 2013/0006938 A1* | 1/2013 | Prahlad et al. | 707/639 |
| 2013/0073532 A1* | 3/2013 | Bachar et al. | 707/704 |
| 2013/0145085 A1* | 6/2013 | Yu et al. | 711/103 |

OTHER PUBLICATIONS

Official Communication in U.S. Appl. No. 13/538,921 mailed Nov. 19, 2013.

* cited by examiner

US 9,058,326 B1

RECOVERY AND FLUSH OF ENDURANT CACHE

TECHNICAL FIELD

Various embodiments relate generally to managing data caching in a distributed file system, and more particularly to, improving performance by enabling a distributed file system cache to be utilize an in-memory cache with a logstore.

BACKGROUND

Today, many computing tasks are performed across distributed computing environments. Typically these environments include non-resident clients devices that make requests to a file stored in a distributed file system. For example, a non-resident device may request data to be written to a particular file on a distributed file system. Many times, these data writes may be executed by one or more computing devices, processors, threads, or the like, executing on or more nodes. Sometimes, these nodes encounter errors, become disconnected, fail, or otherwise crash before the data is completely written to the stable storage of the distributed file system. If such a crash occurs, the data may become corrupted and/or lost completely. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
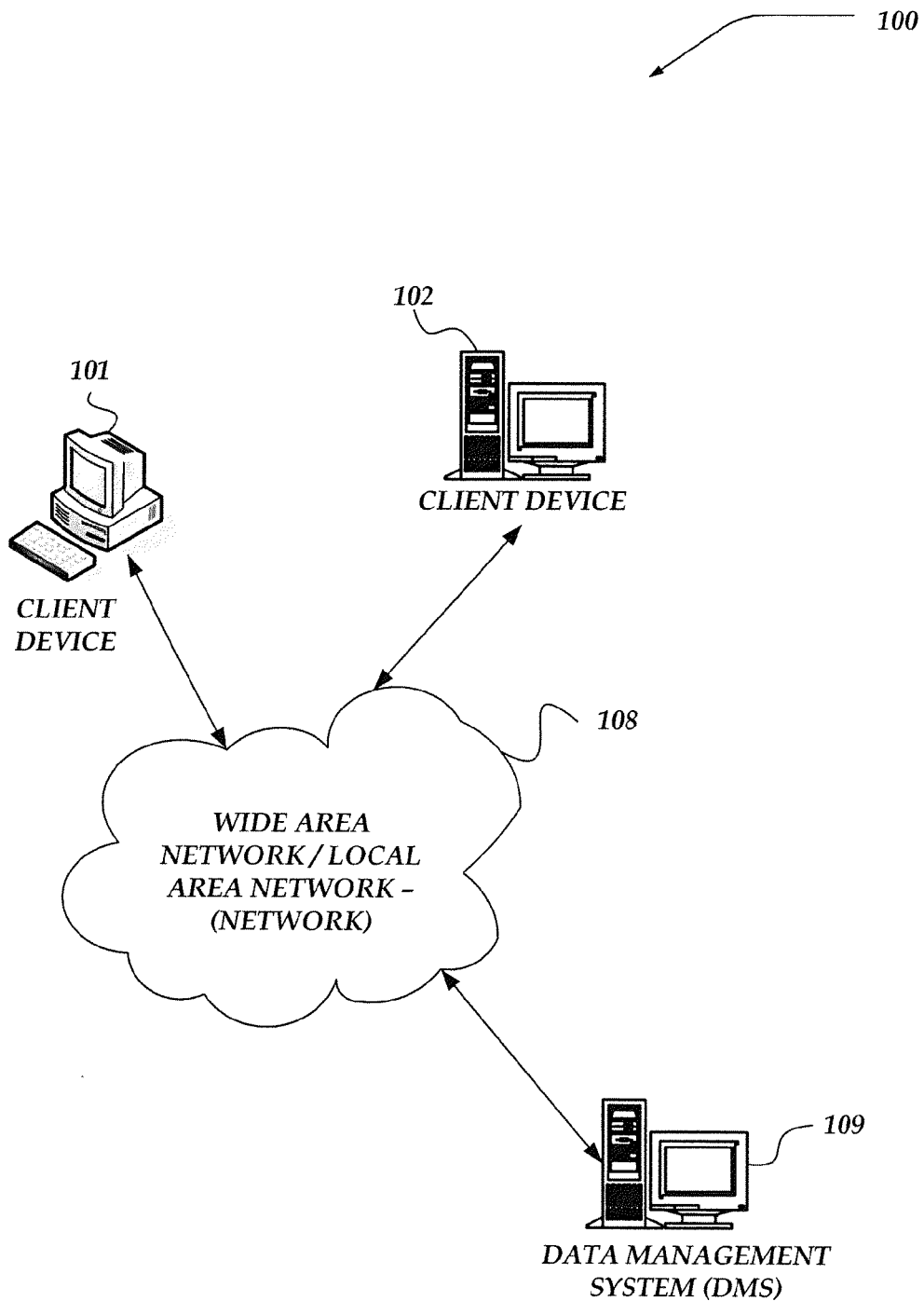
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

"Node" as used herein refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

"Cluster" and/or "cluster of nodes" as used herein refers to one or more logically connected nodes. In some embodiments, each node within a cluster may communicate information about nodes within the cluster to other nodes in the cluster. In some other embodiments, a cluster may include a management node to delegate actions between the nodes in the cluster, manage a status of the cluster, or the like.

"Stable storage" as used herein refers to a classification of computer data storage technology and devices that may be resistant to some hardware, software, and power failures. In at least one of the various embodiments, storage devices for stable storage may often be block devices such as, magnetic platter hard disks, solid state hard drives, optical drives, or the like. Also, stable storage may be achieved using techniques such as, mirroring data on separate hard disks via RAID technology (level 1 or greater), replication of data on separate nodes and/or computing devices, or the like. In general, once data has been recorded on a stable storage device, clients and users may assume that the data may not be lost or corrupted.

"Unstable storage" as used herein refers to a classification of computer data storage technology and devices that may not be resistant to some hardware, software, and power failures. Read and write access to unstable storage may often be very fast compared to stable storage. However, if there may be a power failure or application/system crash, data in affected unstable storage may often be lost and unrecoverable. In at least one of the various embodiments, unstable storage may be implemented using RAM, DRAM, SRAM, or the like, that may lose data if power is lost. In some references, unstable storage may be referred to as volatile storage or volatile memory. In general, users may not assume that data stored in unstable storage may not be lost or corrupted.

"Node cache" as used herein refers to unstable storage associated with a node in a cluster. In at least one of the various embodiments, each node may have a dedicated node cache that may store data written by the node. Node caches may enable faster data writes because the data blocks may be stored in unstable storage that may be much faster to access than stable storage. In at least one of the various embodiments, if required the data blocks contained in the node cache may be written to stable storage.

"Parent file" as used herein refers to a computer file that may be stored in stable storage and may be accessible by one or more nodes.

"Logstore" as used herein refers to an allocated space of memory in stable storage, or on a stable storage device, that may be associated with a parent file. In one embodiment, logstores may be maintained in a centralized stable storage, such that one or more nodes may access the logstores. In some embodiments, the logstores may be a predetermined size or, in other embodiments, variable in size. Logstores may also be arranged as a plurality of non-overlapping blocks of memory. Each block may be a predetermined size, such as, but not limited to, 8 kilobytes. In some embodiments, one or more blocks in a logstore may be reserved as a header block. The header block may include a variety of information about the logstore, such as, but not limited to, a pointer to an associated parent file, an offset within the parent file, a size of the logstore, generation number, or the like. In some other embodiments, the header block may include a bit map to identify valid and invalid blocks of the logstore. A valid block may include data that has not been written to a parent file and an invalid block may include data that has been written to a parent file. In at least one of the various embodiments, an invalid block in a logstore may be available to receive new data that may overwrite the previous contents, if any, of the invalid block.

In some embodiments, a logstore may not be associated with a parent file, but may be available for association with a parent file. In at least one embodiment, an available logstore may be marked as "ready." A ready logstore may be available for use by a same node that previously used the logstore. In another embodiment, an available logstore may be marked as "spare." A spare logstore may be available for use by a different node than the node that previously used the logstore. Use of a logstore may include associating the logstore with a parent file, adding data to the logstore, recovering and flushing data from a logstore, and the like.

"Inode" as used herein refers to data structures that may store information, or meta-data, about files and folders, such as file ownership, access mode (read, write, execute permissions), time and date of creation and modification, file type, logstore lists, or the like. In one embodiment, inode data structures may contain one or more references or pointers to the actual data blocks of the file (i.e. the parent file). In some embodiments, inodes may be in a known location in a file system. From an inode, a reader or writer may access the contents of the inode and the contents of the file. Some file systems implement inodes using a data structure called an inode. In some embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

"Sentinel block" as used herein refers to a block in a logstore that indicates when an inode of a parent file associated with the logstore is accessed by a different node.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the various embodiments are directed towards enabling data writes utilizing a node cache and a logstore stored on a stable storage device. A client device may send data to a node for writing to a parent file. The node may cache the received data prior to writing the data to the parent file. Caching the received data may comprise adding the received data to a node cache of and to a logstore. In one embodiment, the node cache may include a coalescer that combines data from a plurality of data writes from the client device to the node prior to writing to the parent file. In some embodiments, the logstore may be mirrored logstore on one or more stable storage devices. The parent file may periodically be updated from the node cache data. After the parent file is updated, the node cache data and the logstore data may be purged.

In some embodiments, the node cache and/or the parent file may be updated from the logstore data if the logstore may be determined to be stale. A logstore may become stale if a node utilizing the logstore fails, or otherwise crashes, prior to updating the parent file using the node cache data of the node. In one embodiment, a logstore may become stale if a logstore includes a generation number of a node that does not match a current generation number of the same node. In some embodiments, a new generation number for a node may be generated if the node joins or rejoins a cluster of nodes. In one non-limiting, non-exhaustive example, node #1 may generate a generation number, such as "5", when it joins a cluster. However, if node #1 suffers a failure that forces it to drop out of the cluster (e.g., power failures, server reboots, software crashes, or the like) and later re-joins the cluster, then node #1 may create a new generation number, such as 11. In this example, a logstore having a generation number of 5 may be considered to be stale because it may not equal the new generation number of 11.

Illustrative Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, client devices 101-102, and Data Management System ("DMS") 109.

One embodiment of client devices 101-102 is described in more detail below in conjunction with FIG. 2. Generally, however, client devices 101-102 may include virtually any computing device capable of communicating over a network to send and receive information, perform various online activities, offline actions, or the like. Client devices 101-102 also may be configured to send data, including data write requests to another computing device, such as DMS 109. In one embodiment, one or more of client devices 101-102 may be configured to operate within a business or other entity to perform a variety of services for the business or other entity. For example, client devices 101-102 may be configured to operate as a web server, an accounting server, a production server, an inventory server, or the like. However, client devices 101-102 are not constrained to these services and may also be employed, for example, as an end-user computing node, in other embodiments. Further, it should be recognized that more or less client devices may be included within a system such as described herein, and embodiments are therefore not constrained by the number or type of client devices employed.

Devices that may operate as client devices 101-102 may include devices that typically connect using a wired or wireless communications medium such as personal computers, servers, multiprocessor systems, microprocessor-based or programmable consumer electronics, network PCs, or the like. In one embodiment, at least some of client devices 101-102 may operate over wired and/or wireless network, such as network 108. In some embodiments, client devices 101-102 may include virtually any portable computing device capable of receiving and sending a message over a network, such as a wireless network. Although FIG. 1 illustrates two client devices (client devices 101-102), more or less client devices may also be employed.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 101-102 may further be configured to include a client application that enables an end-user to log into an end-user account that may be managed by another computing device, such as DMS 109, or the like. Such end-user account, in one non-limiting example, may be configured to enable the end-user to write data to a parent file on another computing device, such as DMS 109. However, participation in such online activities may also be performed without logging into the end-user account.

The client application may further provide information that identifies itself, including a type, capability, name, and the like. In one embodiment, client devices 101-102 may uniquely identify themselves through any of a variety of mechanisms, including an IP address, or other device identifier. Such information may be provided in a network packet, or the like, sent between other client devices, DMS 109, or other computing devices.

Network 108 is configured to couple network devices with other computing devices, including, DMS 109 and client devices 101-102. Network 108 is enabled to employ any form of computer readable media for communicating information from one electronic device to another. Also, network 108 can include the Internet in addition to local area networks ("LANs"), wide area networks ("WANs"), direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiment, network 108 may be further configurable as a wireless network, which may further employ a plurality of access technologies including 2nd ("2G"), 3rd ("3G"), 4th ("4G") generation radio access for cellular systems, WLAN, Wireless Router ("WR") mesh, and the like. In one non-limiting example, network 108, when configured as a wireless network, may enable a radio connection through a radio network access such as Global System for Mobile communication ("GSM"), General Packet Radio Services ("GPRS"), Enhanced Data GSM Environment ("EDGE"), Wideband Code Division Multiple Access ("WCDMA"), and the like.

DMS 109 includes virtually any network device usable to receive data for writing to a parent file utilizing an in-memory cache and a logstore. DMS 109 may be configured to receive the data from client devices 101-102. DMS 109 may employ processes such as described below in conjunction with FIGS. 6-9 and/or FIGS. 12-17 to perform at least some of its actions.

Devices that may operate as DMS 109 include various network devices, including, but not limited to personal computers, desktop computers, multiprocessor systems, microprocessor-based or programmable consumer electronics, network PCs, server devices, network appliances, and the like.

Although FIG. 1 illustrates DMS 109 as a single computing device, the invention is not so limited. For example, one or more functions of the DMS 109 may be distributed across one or more distinct network devices. In some embodiments, DMS 109 may include one or more nodes, one or more clusters, and/or a centralized data store.

Moreover, DMS 109 is not limited to a particular configuration. Thus, in one embodiment, DMS 109 may contain a plurality of network devices. Similarly, in another embodiment, DMS 109 may contain a plurality of network devices that operate using a master/slave approach, where one of the plurality of network devices of DMS 109 operates to manage and/or otherwise coordinate operations of the other network devices. In other embodiments, the DMS 109 may operate as a plurality of network devices within a cluster architecture, a peer-to-peer architecture, and/or a cloud architecture. Thus, the invention is not to be construed as being limited to a single environment, and other configurations, and architectures are also envisaged.

Illustrative Client Device

Figure 2:
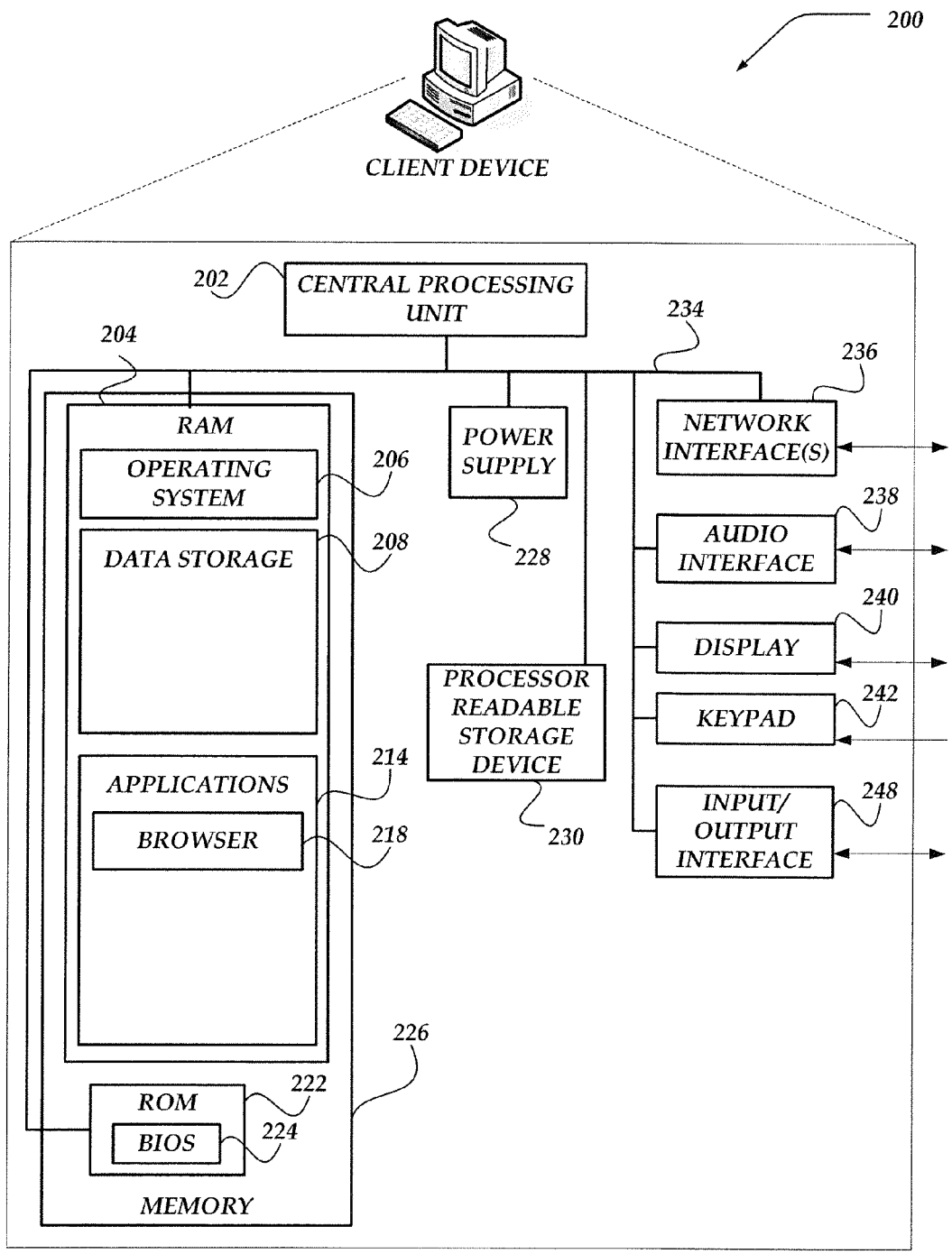
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-102 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgment for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device (not shown) within client device 200.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as DMS 109 of FIG. 1.

Illustrative Network Device

Figure 3:
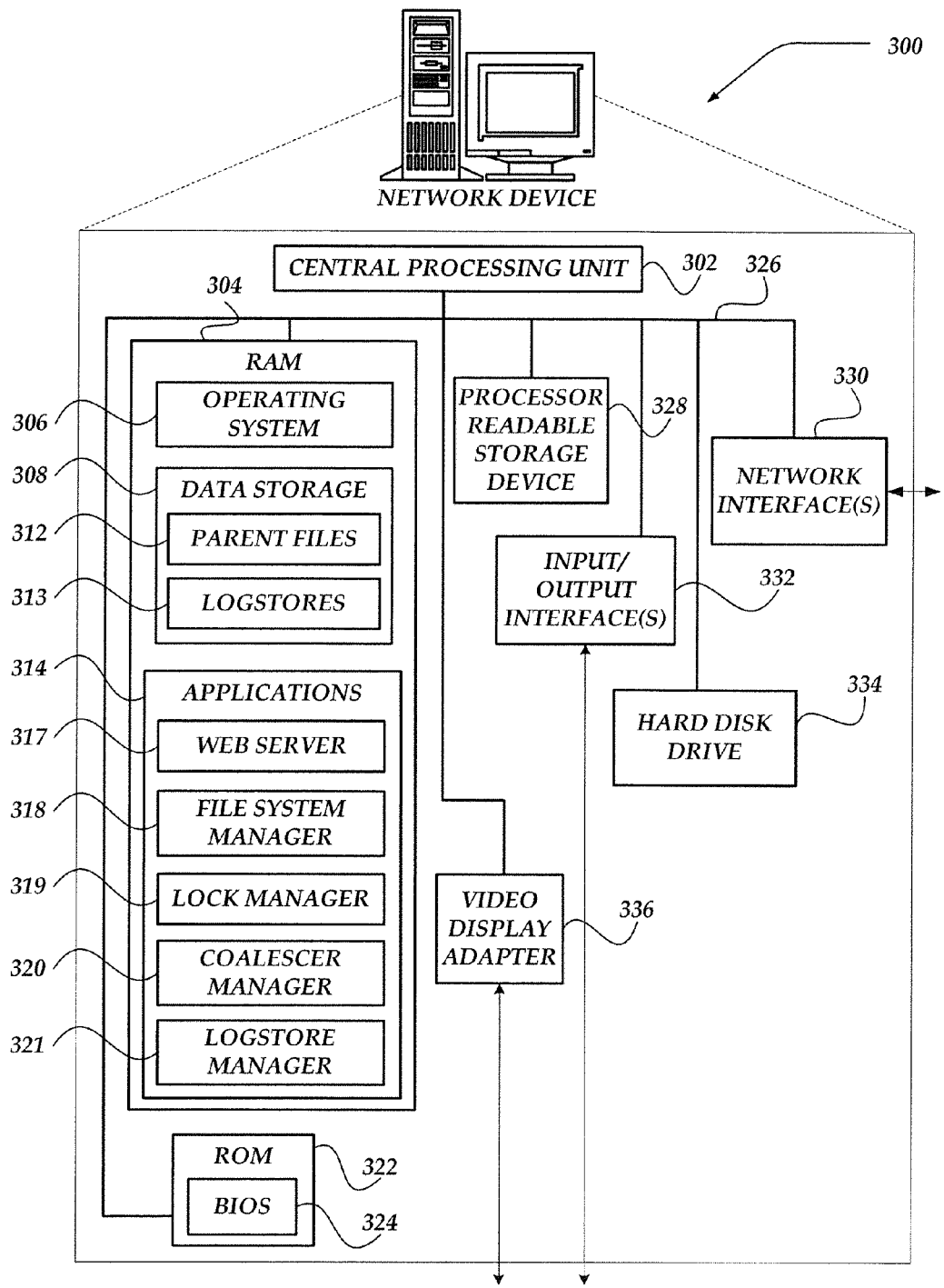
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example DMS 109 of FIG. 1. In some embodiments, network device 300 may be configured as one or more nodes in a cluster of nodes. In other embodiments, network device 300 may be configured as a centralized data store.

Network device 300 includes central processing unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit ("CPU") 302 to execute and perform actions. In one embodiment, at least some of data store 308 might also be stored on another component of network device 300, including, but not limited to processor-readable storage medium 328, hard disk drive 334, or the like. Data storage 308 may further store parent files 312. In some embodiments, parent files 312 include a centralized storage of a plurality of parent files. In some embodiments, data storage 308 may also store logstores 313. In some embodiments, each parent file in parent files 312 may be associated with one or more logstores in logstores 313. In some other embodiments, logstores 313 may store mirrored logstores. In one embodiment, each logstore in logstores 313 may be accessed by each of a plurality of nodes. In another embodiment, each node may have its own logstore, such as, for example, when a plurality of nodes receive write requests from client devices for overlapping range of data within the parent file.

The mass memory may also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Applications 314 may also include web server 317, file system manager 318, lock manager 319, coalescer manager 320, and/or logstore manager 321.

Web server 317 represents any of a variety of services that are configured to provide content, including messages, over a network to another computing device. Thus, web server 317 includes, for example, a web server, a File Transfer Protocol ("FTP") server, a database server, a content server, or the like. Web server 317 may provide the content including messages over the network using any of a variety of formats including, but not limited to WAP, HDML, WML, SGML, HTML, XML, Compact HTML ("cHTML"), Extensible HTML ("xHTML"), or the like.

File system manager 318 may include one or more file system applications that manage access to files stored and/or managed by network device 300, such as parent files 312.

Lock manager 319 may be configured to manage, read, and/or write data locks for parent files 312. In some embodiments, lock manager 319 may provide locks to one or more nodes for one or more parent files. In one embodiment, lock manager 319 may coordinate lock transfers between nodes when a plurality of nodes request data locks on an overlapping range of data in a parent file. In other embodiments, lock manager 319 may also manage read and/or write data locks for logstores 313.

Coalescer manager 320 may be configured to manage a node cache for a node. In some embodiments, each node may include coalescer manager 320 for managing its node cache. In one embodiment, coalescer manager 320 may add data received from a client device, such as client device 200 of FIG. 2, to the node cache of the corresponding node. In some embodiments, coalescer manager 320 may enable the node cache to combine multiple data writes from a client device, such as client device 200 of FIG. 2. Coalescer manager 320 may also be configured to update a parent file with the data stored in the node cache. In other embodiments, coalescer manager 320 may be enabled to purge the node cache. In some other embodiments, coalescer manager 320 may be configured to communicate with logstore manager 321 to update the node cache from a logstore, such as logstores 313.

Logstore manager 321 may be configured to manage logstores 313. In some embodiments, logstore manager 321 may manage one or more logstores associated with each parent file. Logstore manager 321 may be configured to add data received from a client device to a logstore. In some embodiments, logstore manager 321 may be configured to append the received data to a logstore. Logstore manager 321 may be configured to update a parent file with logstore data, such as if the logstore becomes stale. Logstore manager 321 may also be configured to invalidate the cached data in a logstore. In some embodiments, logstore manager 321 may be configured to manage mirrored logstores.

In any event, file system manager 318, lock manager 319, coalescer manager 320, and/or logstore manager 321 may employ processes, or parts of processes, similar to those described in conjunction with FIGS. 6-9 and/or FIGS. 12-17 to perform at least some of its actions.

System Overview

Figure 4:
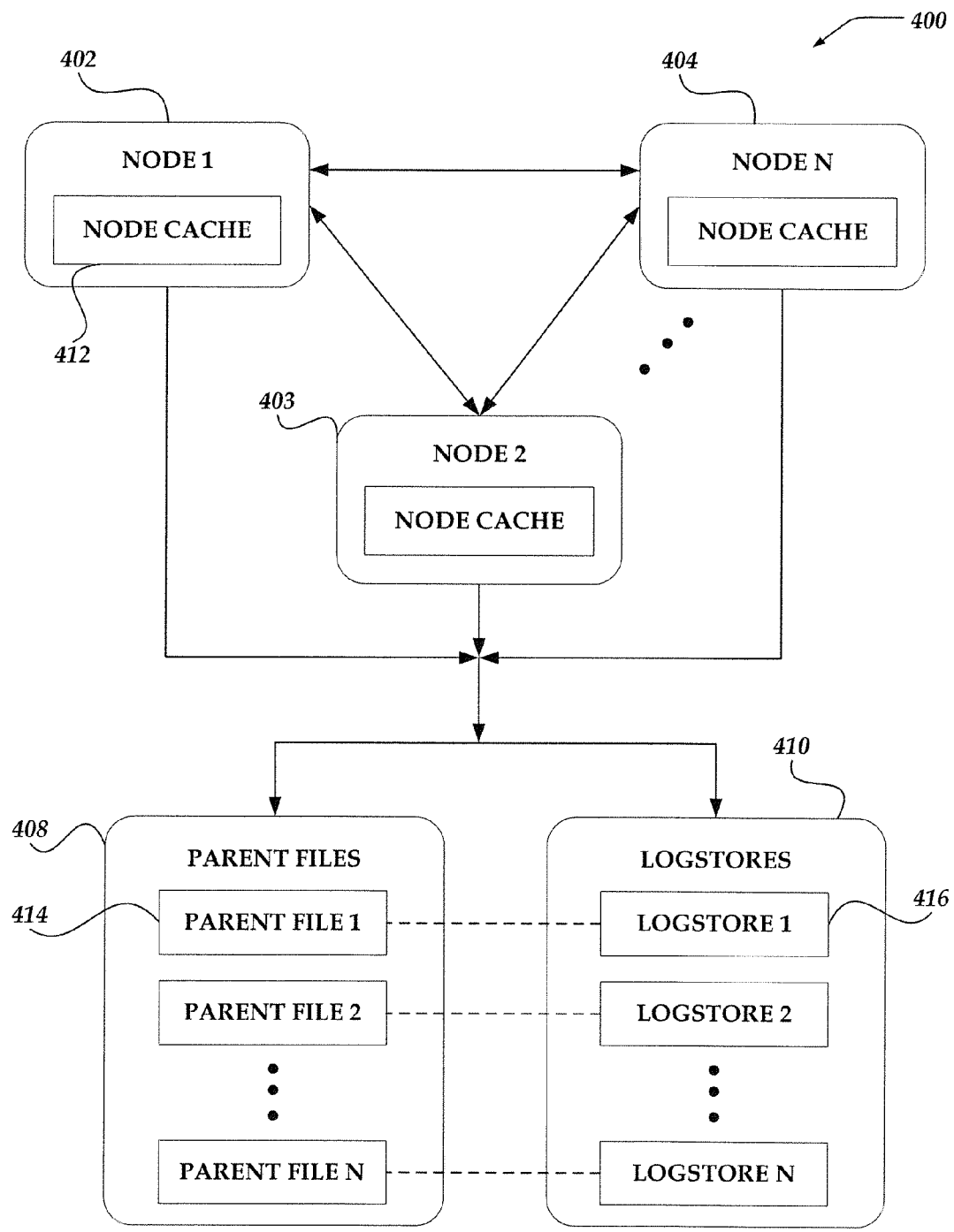
FIG. 4 illustrates an overview system diagram generally showing one embodiment of a cluster of nodes communicating with a centralized data store of parent files.

FIG. 4 illustrates an overview system diagram generally showing one embodiment of a cluster of nodes communicating with a centralized data store. As shown, system 400 includes nodes 402-404, parent files 408, and logstores 410. In some embodiments, parent files 408 and/or logstores 410 may be part of a centralized data store. In at least one of the various embodiments, the centralized store may be in stable storage.

In at least one of the various embodiments, a centralized data store may operate on one or more network devices as part of a distributed file system. As such, a one or more of processes and/or applications may be arranged to enable the centralized data store.

Nodes 402-404 may be a cluster of nodes, where each node in the cluster communicates with other nodes in the cluster. In one embodiment, nodes 402-404 may include a node cache, such as node cache 412. In some embodiments, node cache 412 may be used by a coalescer manager that may combine data from a plurality of data writes from a client device prior if updating an underlying parent file stored in stable storage. As illustrated, nodes 402-404 may communicate with parent files 408 and logstores 410.

Parent files 408 may include one or more parent files, such as parent file 414. Similarly, logstores 410 may include one or more logstores, such as logstore 416. In some embodiments, each parent file may be associated with one or more logstores. For example, as shown parent file 414 is associated with logstore 416. In some embodiments, a plurality of logstores associated with a same parent file may be referred to as a logfile. In one embodiment, each node may be associated with different logstores for a same parent file (not shown). In at least one of the various embodiments, parent files may be stored in stables. Also, in at least one of the various embodiments, logstore may be stored in stable storage.

Figure 5:
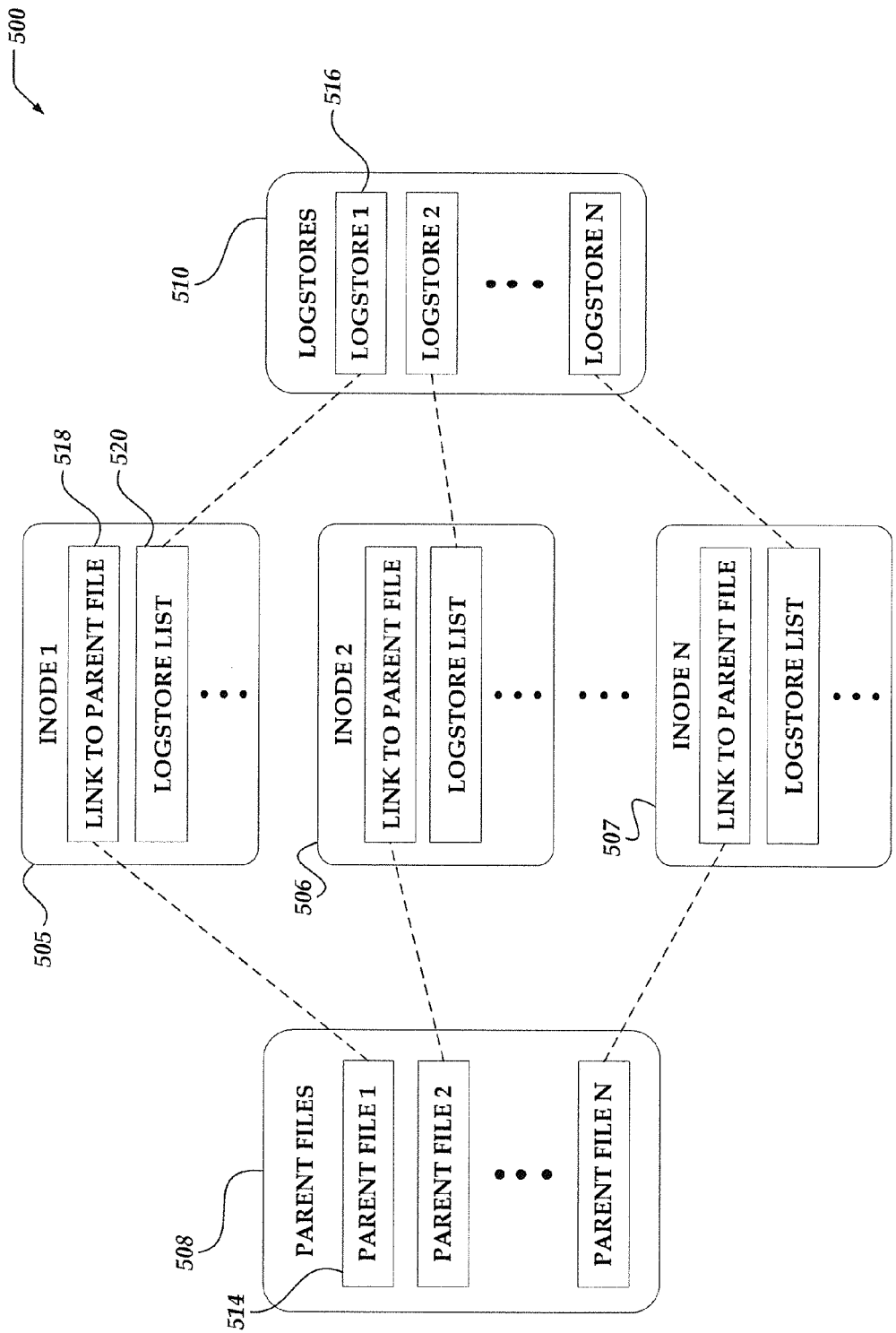
FIG. 5 illustrates a system diagram generally showing one embodiment of relationships between parent files, inodes, and logstores.

FIG. 5 illustrates a system diagram generally showing one embodiment of relationships between parent files, inodes, and logstores. As shown, system 500 may include parent files 508, inodes 505-507, and logstores 510. Parent files 508 may be an embodiment of parent files 408 of FIG. 4. Logstores 510 may be an embodiment of logstores 410 of FIG. 4.

As illustrated, inodes 505-507 may include a plurality of information, such as a link to a parent file and a logstore list. For example, inode 505 includes link to parent file 518 and logstore list 520. In one embodiment, link to parent file 518 may be a pointer to the contents of parent file 514. In another embodiment, logstore list 520 may be a pointer to logstore 516. In some embodiments, logstore 516 may also include a link (not shown) to parent file 514. Although FIG. 5 illustrates inodes 505-507 as including a link to a parent file and a logstore list, inodes 505-507 may include additional information, such as, but not limited to, file ownership, access mode, time and data of creation and modification, file type, or the like.

General Operation

Figure 6:
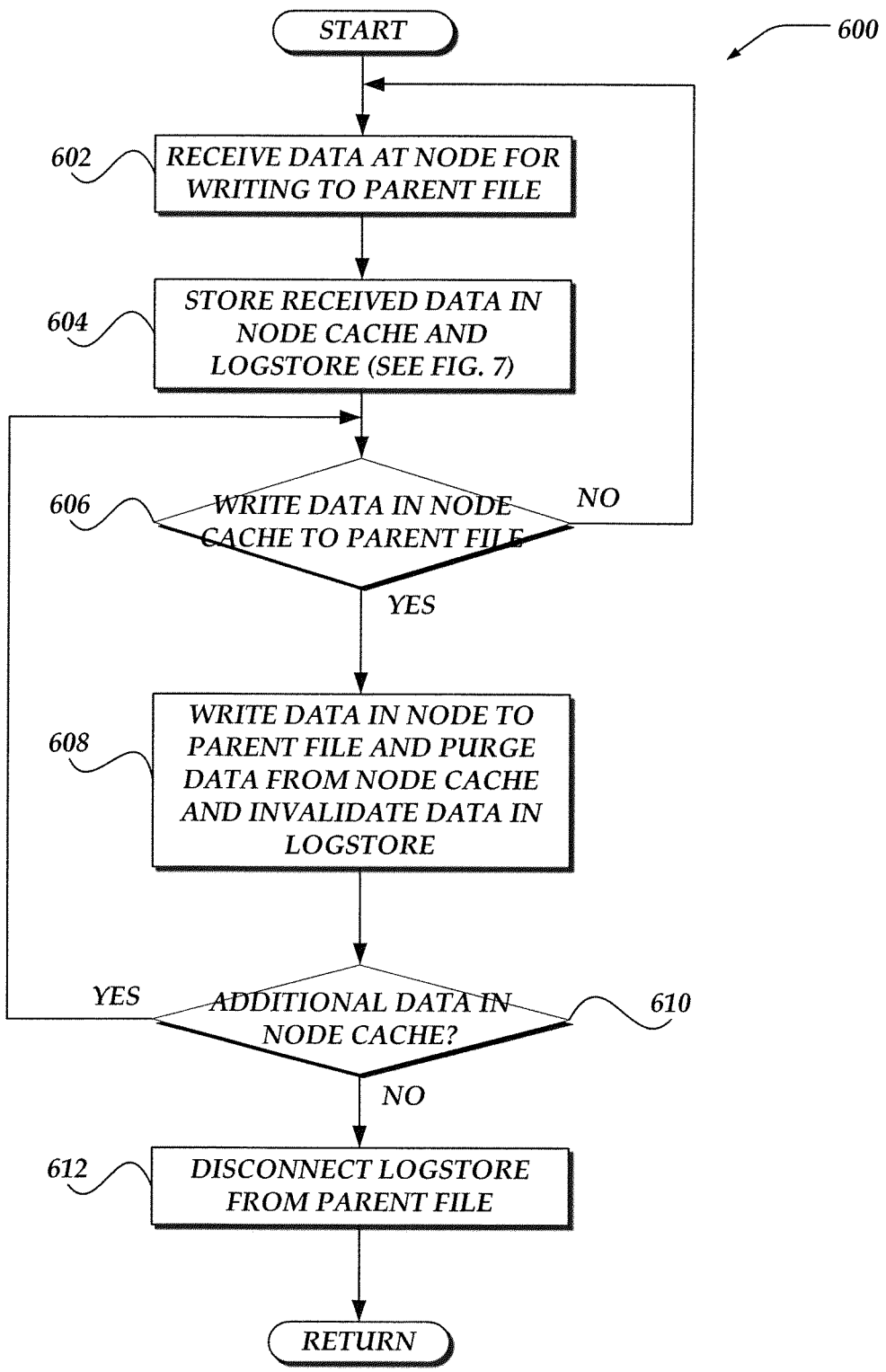
FIG. 6 illustrates a logical flow diagram generally showing one embodiment of an overview process for updating a parent file using cached data.

The operation of certain aspects of the invention will now be described with respect to FIGS. 6-10. FIG. 6 illustrates a logical flow diagram generally showing at least one embodiment of an overview process for updating a parent file using a node cache. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a cluster, or a plurality of network devices, such as network device 300 of FIG. 3.

Process 600 begins, after a start block, at block 602, where data may be received at a node device for writing to a parent file. In one embodiment, the data may be received from a non-resident client device, such as client device 200 of FIG. 2.

Process 600 then proceeds to block 604, which is described in more detail below in conjunction with FIG. 7. Briefly, however, at block 604, the received data may be stored in a node cache and a logstore.

Process 600 continues at decision block 606, where a determination is made if to write the data in the node cache to the underlying parent file. In some embodiments, a plurality of received data may be stored in the node cache prior to flushing the data from the node cache to the underlying parent file. In one embodiment, the parent file may be updated if a predetermined amount of data may be cached, at predetermined time intervals, if the node receives data to be written to a different parent file, or any combination thereof. If the data in the node cache may written to the parent file, then processing may flow to block 608; otherwise, process 600 may loop to block 602 to receive other data for writing to the underlying parent file.

At block 608, the data in the node cache may be flushed to update the underlying parent file and the cached data may be purged from the node. In some embodiments, the node may obtain a lock on at least a subset of the parent file prior to updating the parent file. After the parent file is updated, the node may, in one embodiment, release the locks corresponding to data that may have been flushed from the node cache to the underlying parent file. In at least one of the various embodiments, updating the parent file includes, writing all data in the node cache to the parent file on the stable storage device In some embodiments, a node may steal a lock from another node if it may be flushing a node cache having data from that may overlap with the other node's lock on the parent file. One embodiment of lock stealing is described below in conjunction with FIG. 10. In at least one embodiment purging cached data from the node may include purging the node cache and invalidating corresponding data in a corresponding logstore. In various embodiments, a subset of the data in the node cache may be purged and a subset of the data in the logstore invalidated.

Processing then proceeds to decision block 610, where a determination may be made whether there is additional data in the node cache. In some embodiments, a node may contain additional data if a subset of the data was written to the parent file at block 608. If there is additional data in the node cache, then processing may loop to decision block 606; otherwise, processing may flow to block 612. In some other embodiments, processing may flow (not shown) to block 602 to receive additional data to write to the parent file.

At block 612, the logstore may be disconnected from the parent file. In at least one of the various embodiments, a logstore may be disconnected from the parent file by deleting a link, reference, identifier, or the like, to the logstore in an inode of the parent file. In some embodiments, a disconnected logstore be deleted, marked as ready, marked as spare, or the like. In at least one embodiment, a logstore marked as ready may be available for use by a same node. For example, the logstore may be used by a same node and associated with another parent file. In another embodiment, a logstore marked as spare may be available for use by another node. One example embodiment of managing logstores is described in more detail below in conjunction with FIG. 17. In at least one of various embodiments, block 612 may be optional. After block 612, process 600 may return to a calling process to perform other actions.

Figure 7:
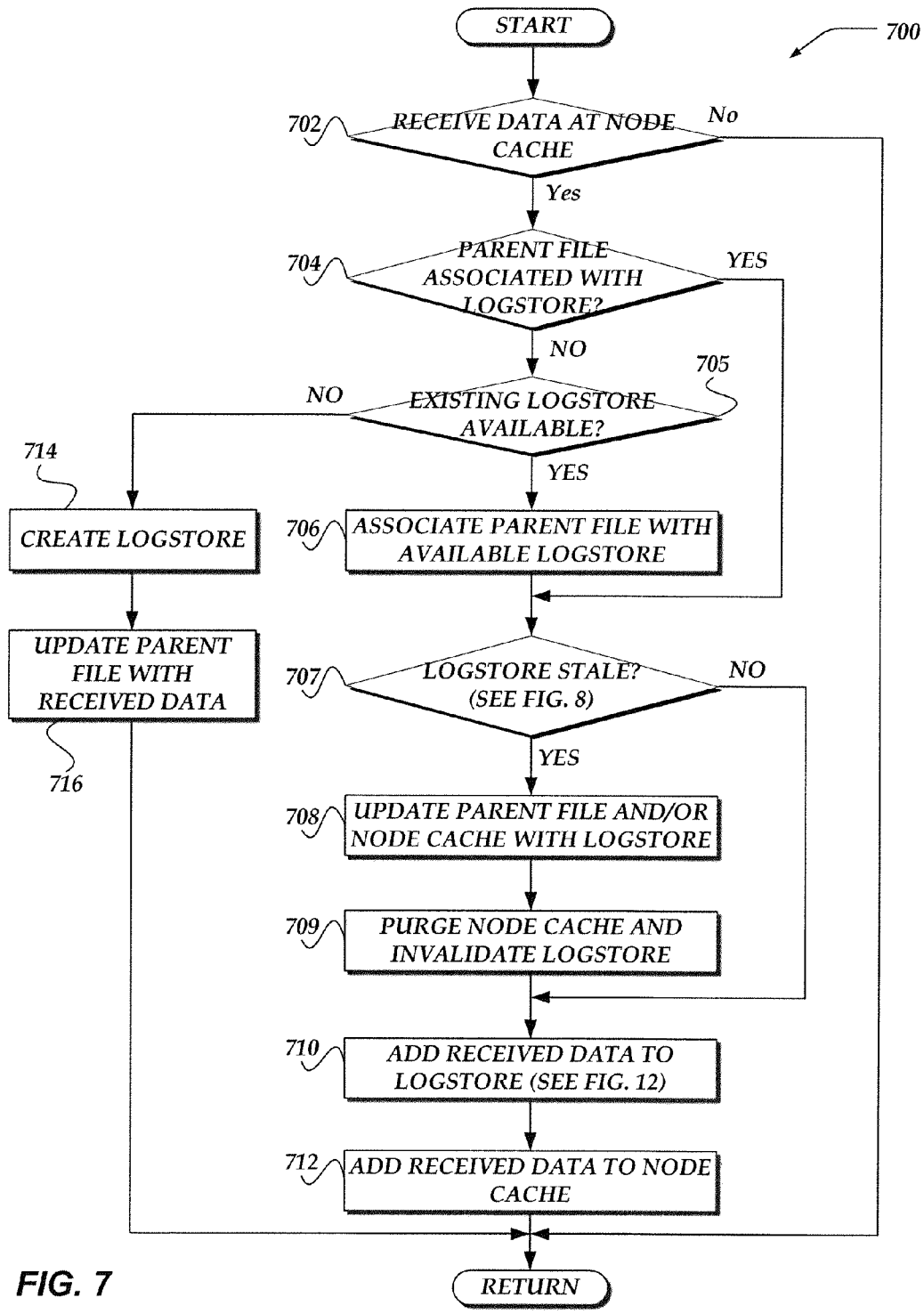
FIG. 7 illustrates a logical flow diagram generally showing one embodiment of a process for utilizing a node cache and a logstore to cache data.

FIG. 7 illustrates a logical flow diagram generally showing one embodiment of a process for utilizing a node cache and a logstore to cache data. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a cluster, or a plurality of network devices, such as network device 300 of FIG. 3.

Process 700 begins, after a start block, at decision block 702, where a determination may be made whether data may be received at the node cache. In one embodiment, an inode of a parent file may include a flag that indicates whether data destined for the parent file may be cached prior to writing it through to the parent file. In some embodiments, the received data may not be stored in a cache rather the data may be directly written to the underlying parent file. If received data may be stored in the node cache of the node, then processing may flow to decision block 704; otherwise, process 700 may return control to a calling process to perform other actions.

At decision block 704, a determination may be made whether a parent file of the received data may be associated with a logstore. In one embodiment, an inode of the parent file may include a link to one or more logstores. If the parent file is associated with a logstore, then processing may flow to decision block 707; otherwise, processing may flow to decision block 705.

At decision block 705, a determination may be made whether an existing logstore is available. In one embodiment, an existing logstore may be available if it is marked as ready or spare, such as at block 612 of FIG. 6. If an existing logstore is available, then processing may flow to block 706; otherwise, processing may flow to block 714.

At block 714, a logstore may be created. In some embodiments, creating a logstore may include allocating storage space in stable storage, determining a block size for the blocks of the logstore, creating a header block for the logstore, initializing a bitmap for the logstore (e.g., set each bit in the bitmap to '0'), and the like. In at least one of the various embodiments, the new logstore may be associated with a parent file. In one such embodiment, an inode of the parent file may be modified to include an identifier and/or link to the created logstore. In other embodiments, the new logstore may be marked as ready and/or spare.

Process 700 then proceeds to block 716, where the parent file is updated with the received data. In at least one of the various embodiments, updating the parent file may include writing the received data to the parent file. In another embodiment, the node cache may be purged. In at least one of various embodiments, block 716 may employ embodiments of block 708 and/or 709 to update the parent file and/or purge the node cache.

If, at decision block 705, an existing logstore is available, then processing may flow to block 706. At block 706, the parent file may be associated with the available logstore. In one embodiment, an inode of the parent file may be updated to include a link, reference, identifier, or the like, of the available logstore.

Process 700 continues at decision block 707. At decision block 707, a determination may be made whether the logstore may be stale. In some embodiments, a logstore may be stale if a logstore includes data that was written to it by a node that left and later rejoined a cluster of nodes. One embodiment of determining if a logstore is stale is described below in conjunction with FIG. 8. If the logstore is stale, processing may flow to block 708; otherwise, processing may flow to block 710.

At block 708, the parent file and/or a node cache may be updated from the logstore. In at least one of the various embodiments, updating the parent file may include writing the received data to the parent file. In one embodiment, the parent file may be updated directly from logstore. In another embodiment, the node cache may be updated from the logstore. In some embodiments, the parent file may be updated from the updated node cache. In at least one of the various embodiments, a logstore may be used to restore the state of a node cache that may have been lost, or made unavailable, as a result of a power failure, system crash, scheduled maintenance reboot, or the like. In at least one of the various embodiments, data corresponding to a node cache may be read from one or more logstores and stored in the node cache as part of restoring the node cache.

In some embodiments, prior to updating the parent file and/or the node cache the node may obtain one or more locks on at least a subset of the underlying parent file and/or at least a subset of the logstore. In one embodiment, the node may obtain a lock on a subset of the logstore for data that may overlap a same range in the parent file as the received data. In some embodiments, a node may steal a lock from another node, such as described below in conjunction with FIG. 10.

In any event, process 700 next proceeds to block 709, where the node cache and the logstore may be purged. In one embodiment, the node cache may be purged by clearing the data stored in the node cache. In at least one of the various embodiments, the node cache may be purged by clearing the data stored in the node cache that may be associated with data written to the parent file. In another embodiment, purging the logstore may include invalidating logstore blocks that may be associated with data written to the parent file. One embodiment of invalidating logstore blocks is described in more detail below in conjunction with FIG. 11. In some other embodiments, the node may release locks for the logstore and/or the parent file for the purged data.

Process 700 continues next at block 710, where the received data may be added to the logstore. In one embodiment, the received data may be appended to the logstore. In another embodiment, the received data may be added to the logstore at a first available/unused set of blocks large enough to store the received data. In some embodiments, complete logstore blocks may be utilized for the received data. For example, 3 kilobytes of received data may take up an 8 kilobyte block in the logstore (assuming each block is 8 kilobytes). In another example, 9 kilobytes of received data may take up two 8 kilobyte blocks in the same logstore. In at least one of the various embodiments, the received data may be arranged into at least one block having the predetermined block size before writing to the logstore.

In at least one of the various embodiments, to improve performance a logstore may be arranged so logging operations may be write-only, thus avoiding administrative reads of the logstore blocks during logging. In at least one of the various embodiments, this may be achieved by arranging the logstore into a set of blocks having a predetermined size. In at least one of the various embodiments, the predetermined size may be based on the integral block size of the underlying file system. Further, in at least one of the various embodiments, writes made to the logstore during the logging process may be limited to data blocks of the predetermined size. Also, in at least one of the various embodiments, logging data writes smaller than the predetermined block size may still result in an entire block of the predetermined size being written to the logstore. If the amount to data logged may be less than what the logstore block may hold the remaining space in the logstore block may be used. For example, if a file system has an integral block size of 8 KB (kilobytes) the smallest unit written to the file system may be 8 KB. If a write of less than 8 KB may be required a file system may have to read in an 8 KB block and then find space in the 8 KB block to write the new data and then write the 8 KB block back to the storage device (e.g., hard disk). In at least one of the various embodiments, using logstore blocks that may be equal to the integral size of the file system may avoid the read operation reducing the time it may take to complete the logging write. In at least one of the various embodiments, if the size of the data comprising the logging write may be less than the predetermined size of the logstore blocks the logging write may write an entire predetermined sized block to the logstore. For example, if a logging write may be 1 KB in size and the predetermined block size may be 8 KB, an 8 KB block containing the 1 KB of data may be written to the logstore.

In some embodiments, the logstore may be mirrored on stable storage, such that the received data may be concurrently added to two or more logstores. In some embodiments, if data is added to a logstore, a current generation number of the node that wrote the data to the logstore may be stored. A generation number of a node may be an identifier that may indicate if a node joins or rejoins a cluster of nodes. In one embodiment, a header block of the logstore may be updated to include the current generation number of the node.

In some embodiments, the received data may be added to the logstore after the node obtains a lock on at least a subset of the logstore. In one embodiment, the node may obtain a write lock on one or more blocks of the logstore. In another embodiment, the node may steal a lock from another node for overlapping data of the parent file. One embodiment of such lock stealing is described below in conjunction with FIG. 10.

Process 700 continues at block 712, where in at least one of the various embodiments, the received data may be stored in the node cache of the node. After block 712, process 700 may return to a calling process to perform other actions.

Figure 8:
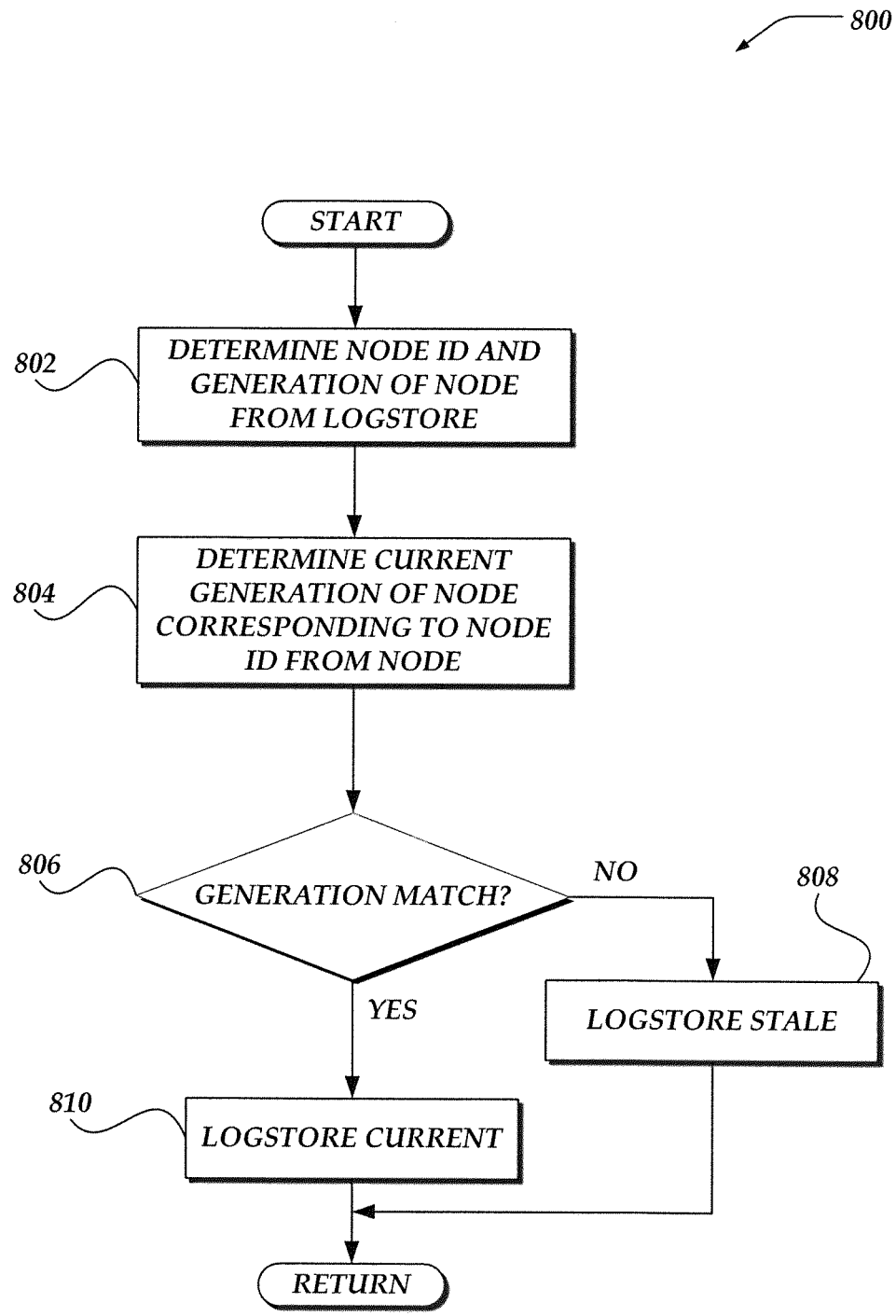
FIG. 8 illustrates a logical flow diagram generally showing one embodiment of a process for determining staleness of a logstore.

FIG. 8 illustrates a logical flow diagram generally showing one embodiment of a process for determining if a logstore may be stale. In at least one of the various embodiments, detecting a stale logstore may indicate that the node cache may require restoring. In some embodiments, process 800 of FIG. 8 may be implemented by and/or executed on a single network device, such as network device 300 of FIG. 3. In other embodiments, process 800 or portions of process 800 of FIG. 8 may be implemented by and/or executed on a cluster or plurality of network devices, such as network device 300 of FIG. 3.

Process 800 begins, after a start block, at block 802, where a node identifier ("node ID") and generation number of the node are determined from the logstore. In one embodiment, the node ID and generation number of the node may be stored in a header block of the logstore. In some embodiments, the generation number of a node may be an identifier that indicates if a node joins or rejoins a cluster of nodes, which is described in more detail below in conjunction with FIG. 9. In some embodiments, a logstore may be updated to include a generation number and node ID of a node that adds received data to the logstore, such as at block 710 of FIG. 7.

Process 800 next proceeds to block 804, where a current generation number of the node that corresponds to the determined node ID may be determined from a node. In one embodiment, the node that corresponds to the determined node ID may be queried to determine the current generation number of the node. In another embodiment, another node in the cluster may provide the current generation number of the node that corresponds to the determined node ID. In some embodiments, a node that corresponds to the node ID may not have a current generation number, such as if the node left the cluster and has not rejoined.

Continuing to decision block 806, a determination may be made whether the generation numbers match. In one embodiment, the generation number of the node from the logstore may be compared to the current generation number of the node. If it may be determined that the generation numbers match, then process 800 proceeds to block 810 where the logstore may be identified as current. In at least one of the various embodiments, a node number and its corresponding generation number may be compared stored at the node to the same node number and its corresponding generation number stored in the header of the logstore. However, if at decision block 806 it is determined that the generation numbers do not match, then process 800 proceeds to block 808 where the logstore may be identified as stale.

In at least one of the various embodiments, a node number and its corresponding generation number may be compared stored at the node to the same node number and its corresponding generation number stored in the header of the logstore. In at least one of the various embodiments, if the corresponding generation numbers are different then the node cache may require restoring from the logstore.

After block 808 and block 810, process 800 may return control to a calling process.

Figure 9:
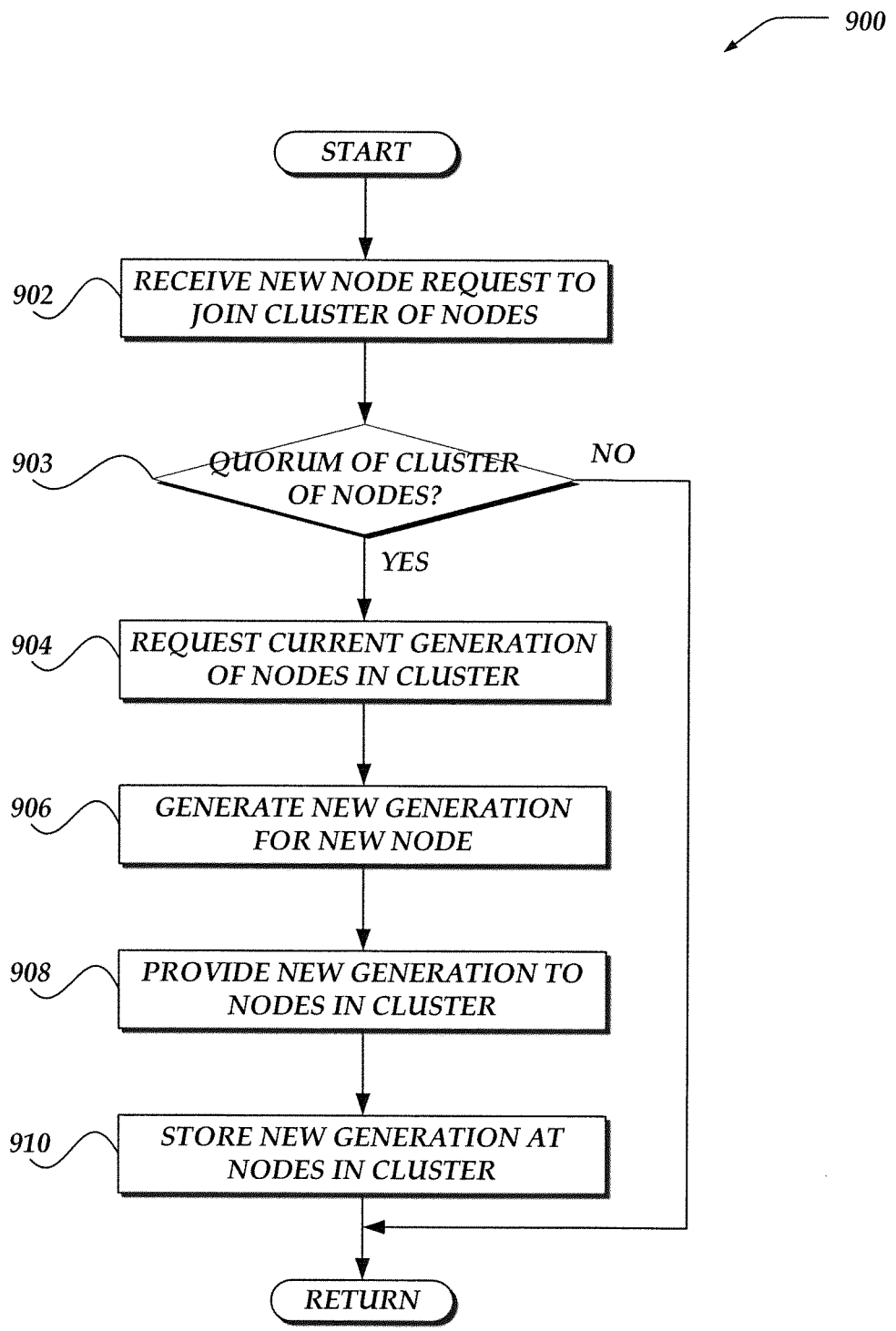
FIG. 9 illustrates a logical flow diagram generally showing one embodiment of a process for generating a new generation for a new node in a cluster of nodes.

FIG. 9 illustrates a logical flow diagram generally showing one embodiment of a process for generating a new generation number for a new node in a cluster of nodes. In some embodiments, process 900 of FIG. 9 may be implemented by and/or executed on a single network device, such as network device 300 of FIG. 3. In other embodiments, process 900 or portions of process 900 of FIG. 9 may be implemented by and/or executed on a plurality of network devices, such as network device 300 of FIG. 3.

Process 900 begins, after a start block, at block 902, where a new node may request to join a cluster of nodes may be received. In one embodiment, the request may be received at one of the other nodes currently in the cluster and/or at a managing node that manages the cluster. In some embodiments, a new node may be a node that is requesting to join a cluster for a first time. In other embodiments, a new node may be a node that is requesting to rejoin a cluster after being disconnected or otherwise logically or physically leaving the cluster.

Processing continues at decision block 903, where a determination may be made whether the cluster of nodes has a quorum. In some embodiments, the quorum may include a majority number of nodes of a cluster communicating with each other. If the cluster of nodes has a quorum, then processing may flow to block 904; otherwise, processing may return to a calling process to perform other actions.

Process 900 next proceeds to block 904 where the current generation number of the nodes in the cluster may be requested. In some embodiments, the new node or a managing node may query each node in the cluster for a current generation number for each respective node. In other embodiments, the managing node may maintain a current generation number for all nodes in the cluster, such that the new node may query the managing node for the current generation numbers of the nodes in the cluster. In yet other embodiments, each node in the cluster may maintain the current generation numbers of the nodes in the cluster.

Continuing to block 906, a new generation number may be generated for the new node. In some embodiments, the new node or a managing node may issue the generation number for the new node based on the current generation number of the other nodes in the cluster. In one embodiment, the new generation number may be determined by incrementing the largest (most recent) generation number by one.

Process 900 then proceeds to block 908, where the new generation number for the new node may be provided or shared with other nodes in the cluster. In one embodiment, the new node may provide the new generation number to a managing node or to other nodes in the cluster. In another embodiment, a managing node may provide the new generation number to the nodes in the cluster.

Proceeding next to block 910, the new generation number may be stored at the nodes in the cluster. In one embodiment, a managing node may store and maintain a current generation number for each node in the cluster. In another embodiment, each node in the cluster may store and maintain a current generation number of each node in the cluster.

After block 910, process 900 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Figure 10:
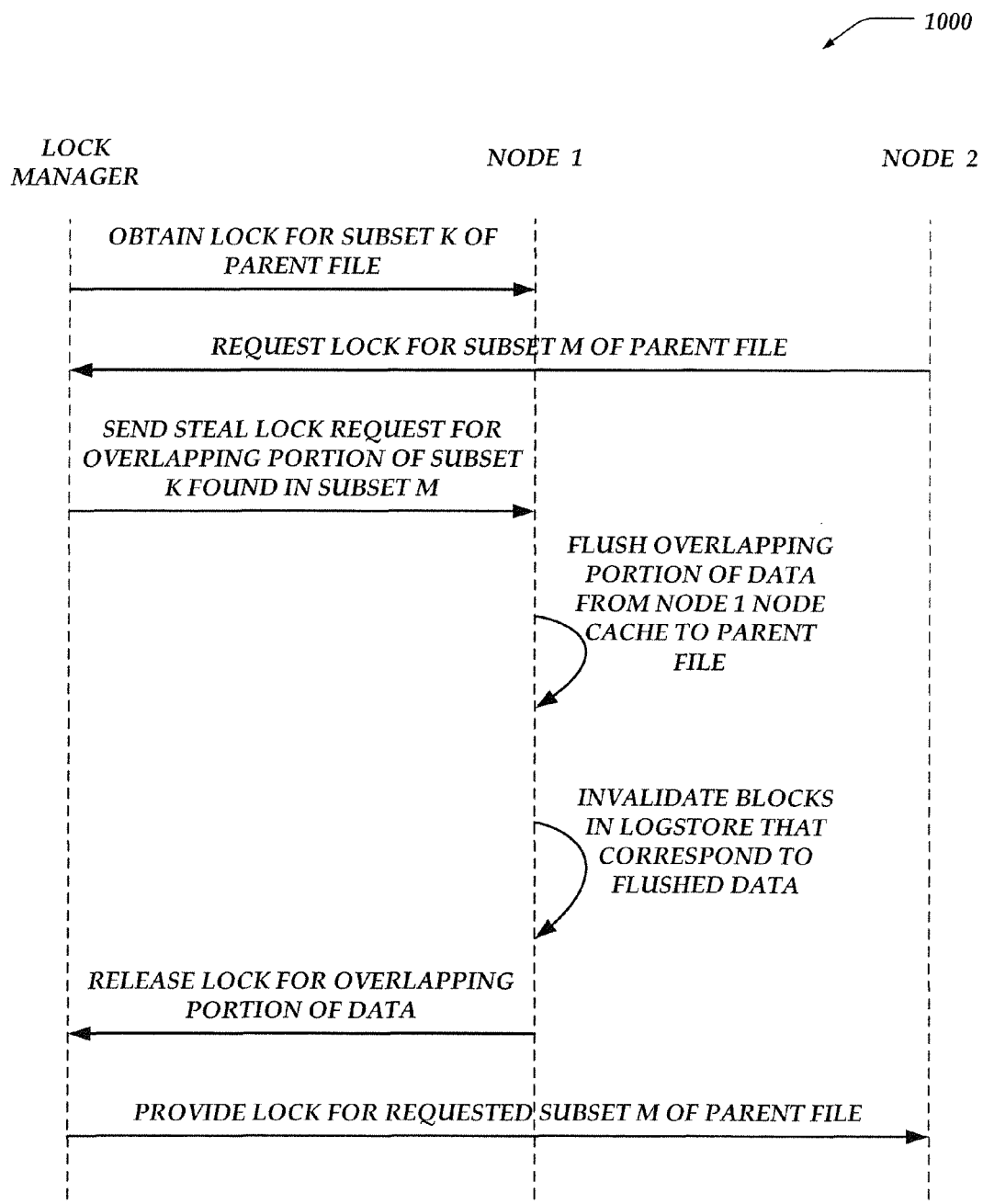
FIG. 10 illustrates a sequence diagram generally showing one embodiment of a sequence for a first node to obtain a lock for data that overlaps a lock held by a second node.

FIG. 10 illustrates a sequence diagram generally showing one embodiment of a sequence for a first node to obtain a lock for data that may overlap a lock held by a second node. Sequence 1000 includes a lock manager, node 1, and node 2. Although sequence 1000 describes a generic lock, the lock may be a read and/or write lock for all or a subset of a parent file and/or all or a subset of a logstore.

Sequence 1000 starts with node 1 obtaining a lock for subset K of a parent file from the lock manager. While node 1 has the lock, node 2 may request a lock for subset M of the parent file from the lock manager. In some embodiments, subset M and subset K may overlap or may not overlap. If subset M and subset K do not overlap, then node 2 may obtain a lock for subset M from the lock manager without a steal lock request, as described in sequence 1000. However, if subset M and subset K overlap, then the lock manager may send a steal lock request to node 1 for the overlapping portion of subset K found in subset M.

After node 1 receives the steal lock request from the lock manager, node 1 flushes the overlapping portion of data from the node 1 node cache to the parent file. Flushing data to the parent file may include updating the parent file with the flushed data. Node 1 can then invalidate blocks in the logstore that correspond to the flushed data. One embodiment of invalidating blocks in the logstore is described in more detail below in conjunction with FIG. 11.

After node 1 flushes its node cache and invalidates corresponding logstore blocks, node 1 releases the lock for the overlapping portion of data to the lock manager. In some embodiments, node 1 may send the lock manager a lock release that may indicate that the overlapping portion of data has been written to the parent file.

If the lock for the overlapping portion of data is released, the lock manager may provide a lock for the requested subset M of the parent file to node 2. In some embodiments, a queue may be utilized to manage a plurality lock requesting for an overlapping portion of data. In such an embodiment, the lock manager may send steal lock requests and provide locks in accordance with sequence 1000 as each overlapping lock request matures in the queue.

Use Case Illustrations

Figure 11A:
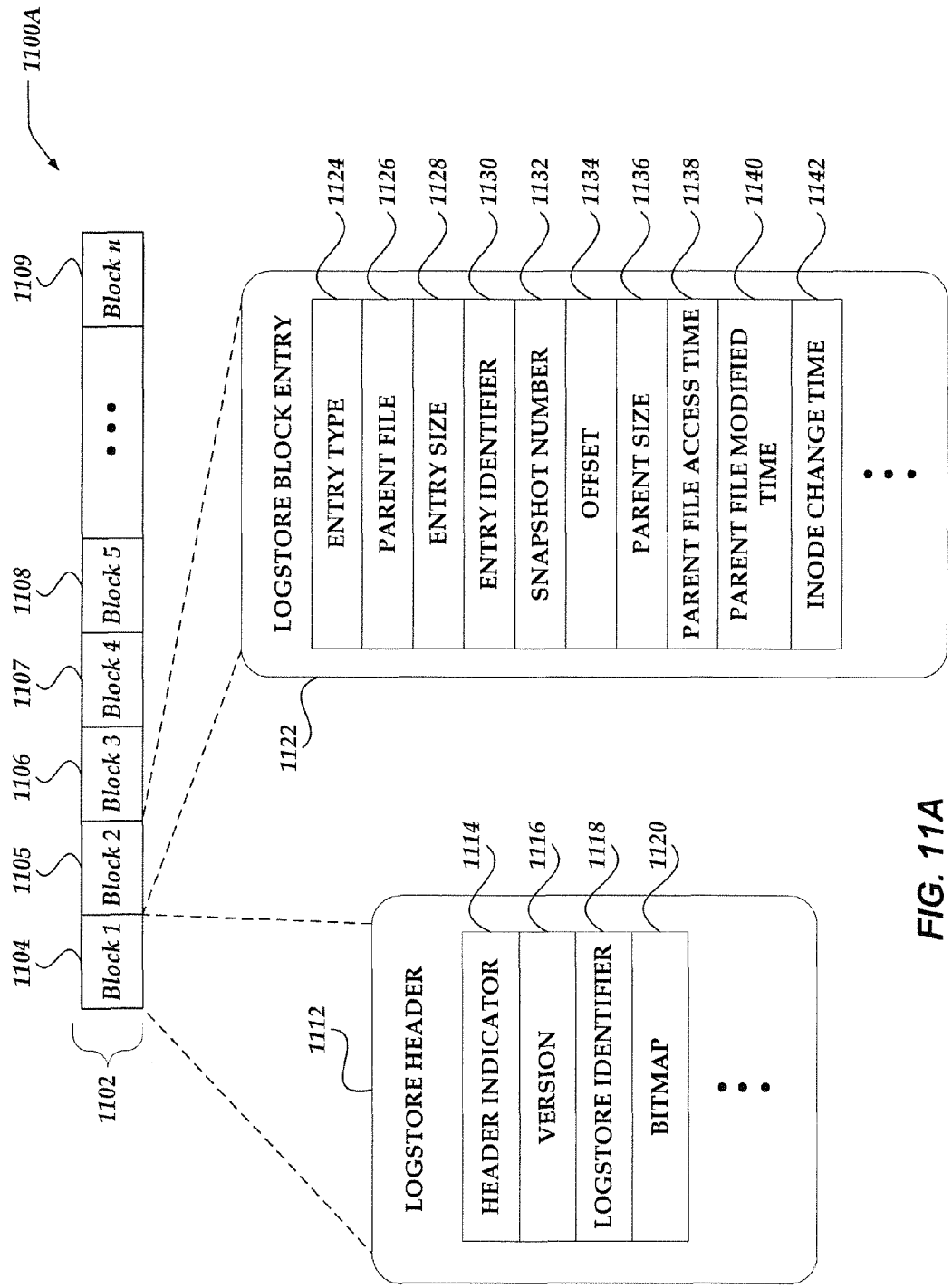
FIGS. 11A and 11B show embodiments of a use case illustrating a logstore format.
Figure 11B:
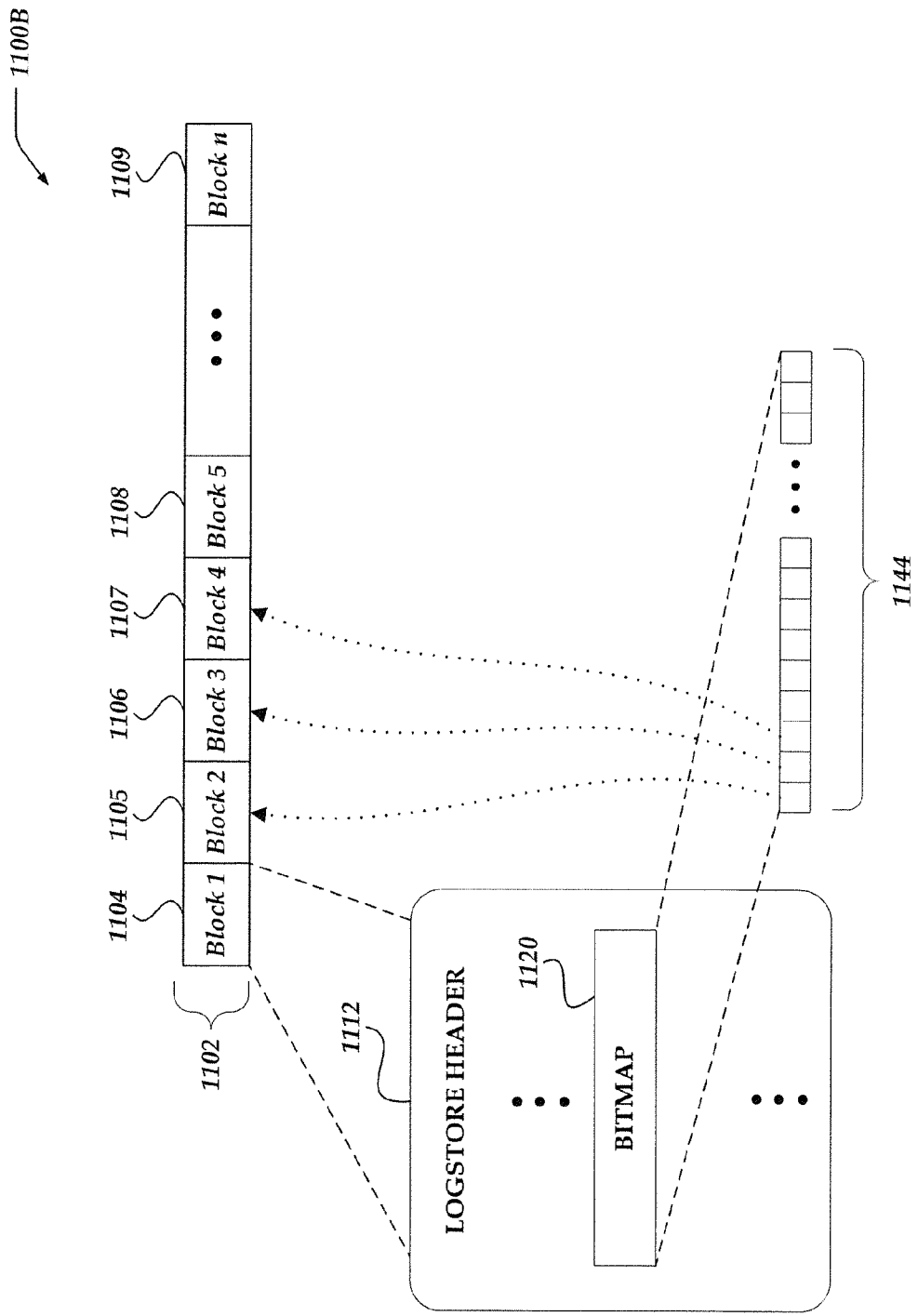

FIGS. 11A and 11B show one embodiment of a use case illustrating a logstore format. FIG. 11A shows embodiments of a use case illustrating contents of a logstore header and a logstore block entry. In one embodiment, logstore 1102 may include a plurality of blocks, such as blocks 1104-1109. In some embodiments, each of blocks 1104-1109 may be a predetermined size. In one embodiment, blocks 1104-1109 may be a uniform size, such as, but not limited to 8 kilobytes. In some embodiments, logstore 1102 may be fixed amount of allocated memory. In other embodiments, logstore 1102 may be a variable amount of allocated memory based on a number of blocks added to the logstore.

In one embodiment, block 1104 may be a header block, such as logstore header 1112. Logstore header 1112 may include a plurality of information that describes the logstore, an associated parent file, or the like. For example, logstore header 1112 may include header indicator 1114, version 1116, logstore identifier 1118, bitmap 1120, and the like. In some embodiments, logstore header 1112 may include additional padding bits (not shown), which may later be allocated. Header indicator 1114 may be a flag and/or other value that indicates that block 1104 is a header block. Version 1116 may be an identifier of the current version of the logstore. Logstore identifier 1118 may be an identifier to uniquely identify logstore 1102. Bitmap 1120 may be utilized to validate and/or invalidate blocks in logstore 1102. One example embodiment of bitmap 1120 is described in more detail below in conjunction with FIG. 11B. In some other embodiments, bitmap 1120 may not be included in logstore header 1112, but may be an individual block (not shown) within logstore 1102.

Blocks 1105-1109 may include blocks of data. In at least one embodiment, blocks 1105-1109 may be a uniform size. In some embodiments, each of blocks 1105-1109 may include a logstore block entry 1122. Logstore block entry 1122 may include entry type 1124, parent file 1126, entry size 1128, entry identifier 1130, snapshot number 1132, offset 1134, parent size 1136, parent file access time 1138, parent file modified time 1140, inode change time 1142, and the like.

Entry type 1124 may include an identifier that indicates whether the block is a data block, sentinel block, or the like. Parent file 1126 may include an identifier, link, reference, or the like to a parent file associated with the data stored in the block. Entry size 1128 may identify a size of the data entered into the block, such as in a number of bytes. Entry identifier 1130 may identify an order in which data was written to a logstore for a parent file. In at least one embodiment, entry identifier 1130 may be a value that monotonically increases when data is entered into logstore 1102 and/or another logstore associated with a same parent file. Snapshot number 1132 may be a maximum snapshot number to which logstore block entry 1122 can be applied. In one embodiment, a snapshot number may be a globally monotonically increasing number when a snapshot of the cluster is taken. Offset 1134 may be an offset within the parent file that corresponds with the data in logstore block entry 1122. Parent size 1136 may be a size of the associated parent file after logstore block entry 1122 is recovered and the parent file updated with the data from logstore block entry 1122. Parent file access time 1138 may include a time when the associated parent file is accessed after logstore block entry 1122 is recovered and the parent file updated with the data from logstore block entry 1122. Parent file modified time 1140 may include a time when the associated parent file is modified after logstore block entry 1122 is recovered and the parent file updated with the data from logstore block entry 1122. Inode change time 1142 may include a time when an inode of the parent file is modified after logstore block entry 1122 is recovered and the parent file updated with the data from logstore block entry 1122.

FIG. 11B shows one embodiment of a use case illustrating a bitmap utilized by a logstore to validate and/or invalidate blocks of the logstore. As illustrated, bit map 1144 may be included in logstore header block 1104. However, embodiments are not so limited and in other embodiments, bit map 1144 may be included in a block separate from the header block (not shown), such as block 1105. Bit map 1144 may be utilized to validate and/or invalidate blocks in logstore 1102. In one embodiment, bit map 1144 may include a plurality of sub-blocks that correspond to different blocks in logstore 1102. For example, a first sub-block may correspond to block 1105, a second sub-block may correspond to block 1106, a third sub-block may correspond to block 1107, and so on. Each sub-block in bit map 1144 may include a value that indicates whether a corresponding block is valid or invalid. However, the invention is not so limited and other methods may be implemented to track a validity of blocks in the logstore.

In one embodiment, each sub-block in bit map 1144 may be a single bit. However, the invention is not so limited and other sizes of bit map sub-blocks may be utilized. In one non-limiting, non-exhaustive example, a "1" may indicate that a corresponding block is valid and a "0" may indicate that the corresponding block is invalid. In some embodiments, a validity of a block may be modified by using journal deltas on a corresponding bit of bit map 1144. In one embodiment, a block may be invalidated by changing a "1" to a "0" when the data from the corresponding block is used to updated the parent file (either directly from the logstore or indirectly through the node cache). A block may be validated by changing a "0" to a "1" when a node adds data to the corresponding block of the logstore. In one embodiment, a bit in bit map 1144 may be changed by taking an exclusive OR of the bit value with a value of "1." In some embodiments, multiple nodes may simultaneously access the logstore and can simultaneously invalidate separate blocks in the logstore. In at least one of the various embodiments, a provided bit map may represent each block of stored data in the logstore and the bit map to be employed to invalidate any block of data stored in the logstore.

Endurant Cache Storage

Figure 12:
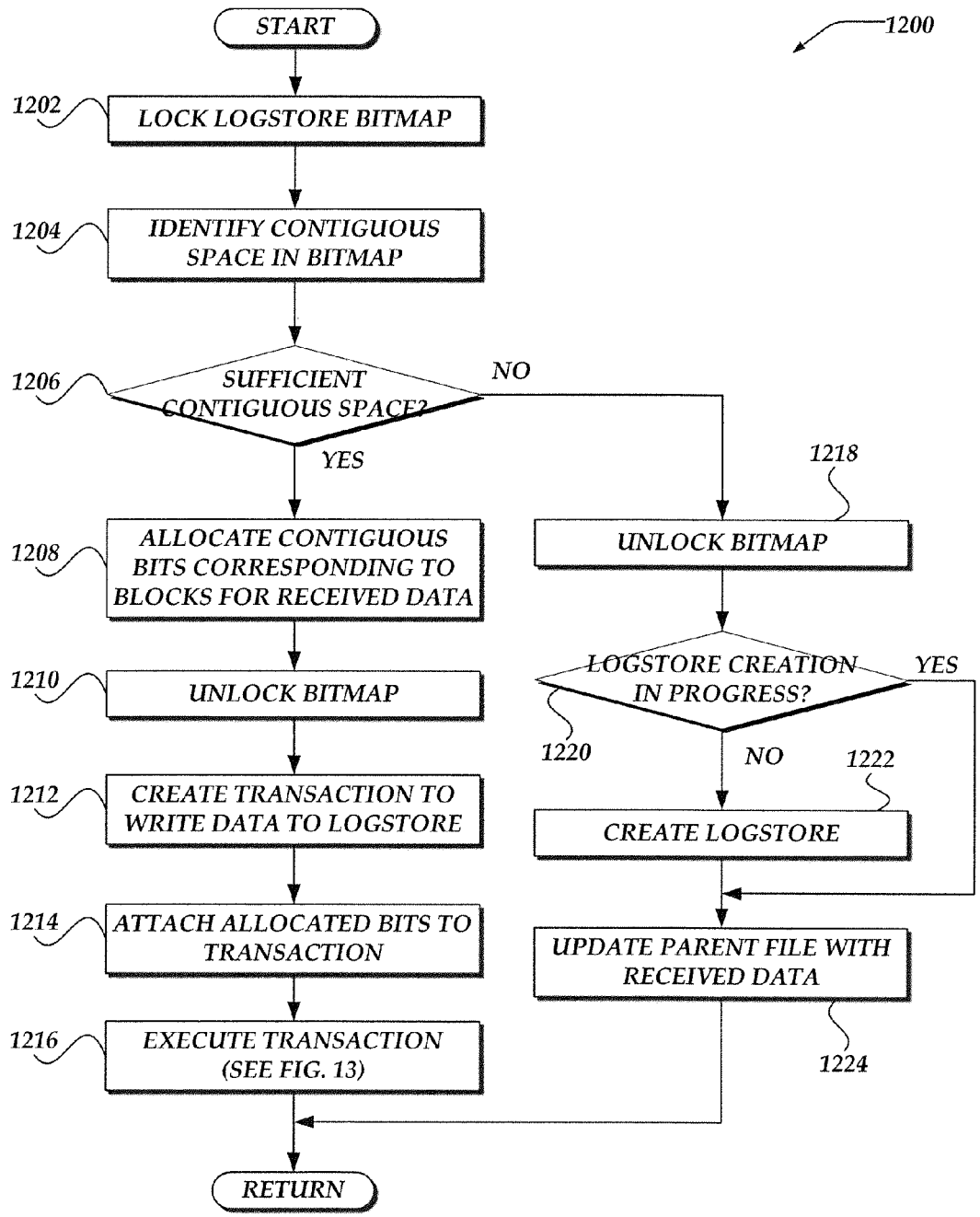
FIG. 12 illustrates a logical flow diagram generally showing one embodiment of a process for initiating a transaction to store received data in a logstore.

The operation of certain aspects of the invention will now be described with respect to FIGS. 12-14. FIG. 12 illustrates a logical flow diagram generally showing one embodiment of a process for initiating a transaction to store received data in a logstore. In some embodiments, process 1200 of FIG. 12 may be implemented by and/or executed on a single network device, such as network device 300 of FIG. 3. In other embodiments, process 1200 or portions of process 1200 of FIG. 12 may be implemented by and/or executed on a cluster, or a plurality of network devices, such as network device 300 of FIG. 3.

Process 1200 begins, after a start block, at block 1202, where a bitmap of a logstore may be locked. In at least one embodiment, the logstore may be associated with a parent file for writing received data, such as at block 706 of FIG. 7. In various embodiments, the bitmap may be locked in memory, such that no other node, process, or the like, can access and/or modify the bitmap.

Process 1200 continues to block 1204, where contiguous space in the bitmap may be identified. In at least one of the various embodiments, contiguous space in the bitmap may correspond to contiguous available blocks in the logstore. As described above, each bit or collection of bits in the bitmap may correspond to a different block within the logstore. In at least one embodiment, a bitmap bit value of '1' may indicate that a corresponding block is currently unavailable, i.e., allocated. In another embodiment, a bitmap bit value of '0' may indicate that the corresponding block is available, i.e., unallocated and/or previously deallocated.

In some embodiments, contiguous space may include a single available block and/or a plurality of available contiguous blocks. In one non-limiting, non-exhaustive example, logstore blocks and the corresponding bitmap bits may be represented as arrays, such as, for example, logstore_block[ ] and bitmap[ ], respectively. In such an example, bitmap[1] may correspond to logstore_block[1], bitmap[2] may correspond to logstore_block[2], and so forth. Continuing the example, bitmap[4] and bitmap[9] may be identified as unavailable, while bitmap[5] through bitmap[8] may be available. As a result, bitmap[5] through bitmap[8] may be identified as contiguous space in the bitmap.

In some embodiments, a plurality of contiguous spaces may be identified. For example, bitmap[2] and bitmap[15], along with bitmap[5] through bitmap[8] from the example above, may also be identified as contiguous space.

In any event, process 1200 next proceeds to decision block 1206, where a determination may be made whether the identified contiguous space is sufficient for the received data. In at least one of various embodiments, a size of the received data may be determined. In some embodiments, a size of at least one of the identified contiguous space may be determined. In at least one embodiment, the size of an identified contiguous space may be determined based on a number of contiguous available bits in the bitmap and a size of each corresponding block. For example, if four contiguous bits in the bitmap are identified as available and each corresponding block is 8 KB (kilobytes), then the size of the contiguous space may be determined to be 32 KB. However, embodiments are not so limiting and other methods of determining a size of the received data and/or identified contiguous space may be employed.

In some embodiments, the size of the received data may be compared to a size of at least identified contiguous space. In at least one embodiment, contiguous space may be sufficient if the size of the contiguous space is greater than the size of the received data. In some other embodiments, a size of each contiguous space may be compared to a size of the received data until sufficient contiguous space is identified. If at least one contiguous space is sufficient, then processing may flow to block 1208; otherwise, processing may flow to block 1218.

At block 1208, the contiguous bits corresponding to blocks for the received data may be allocated. In at least one embodiment, allocating each of the contiguous bits may be performed by changing each bit from a '0' to a '1'. In some embodiments, one of a plurality of contiguous spaces with a size greater than the size of the received data may be selected and allocated.

In some embodiments, a subset of bits of the contiguous space may be allocated. In at least one embodiment, a determination may be made whether a subset of bits in the contiguous space is sufficient for the received data. For example, at block 1204 the identified contiguous space may be four bits that corresponds to 32 KB of contiguous block space. However, if the received data is 8 KB, then a subset of the contiguous space may be allocated, such as, for example, one bit that corresponds to 8 KB of contiguous block space.

In any event, process 1200 next proceeds to block 1210, where the bitmap may be unlocked. In some embodiments, the bitmap may be unlocked such that other nodes, processes, or the like may be allowed to access and/or modify the bitmap.

Continuing to block 1212, a transaction to write data to the logstore may be created. In at least one embodiment, the transaction may include a two-phase commit process, which may enable the data to be written to the logstore. In some embodiments, the transaction may include utilizing a coordinator (e.g., a coordinator node) to facilitate writing received data to the logstore.

Process 1200 then proceeds to block 1214, where the allocated bits may be attached to the transaction. In some embodiments, attaching the allocated bits to the transaction may include storing a record of the allocated bits in the transaction. For example, if contiguous bits bitmap[4] through bitmap[8] are allocated in block 1208, then the transaction may be modified to include information indicating that bitmap[4] through bitmap[8] were allocated for the transaction.

Process 1200 next continues at block 1216, which is described in more detail below in conjunction with FIG. 13. Briefly, however, at block 1216, the transaction to write data to the logstore may be executed. After block 1216 process 1200 may return to a calling process to perform other actions.

If, at decision block 1206, the contiguous space is not sufficient for the received data, then processing may flow to block 1218. At block 1218, the bitmap may be unlocked. In at least one of various embodiments, block 1218 may employ embodiments of block 1210 to unlock the bitmap.

Process 1200 next proceeds to decision block 1220, where a determination may be made whether a logstore creation is in progress. In at least one embodiment, a logstore creation may be in progress if a node, process, or the like is in the process of creating a logstore associated with the parent file. If a logstore is being created, then processing may flow to block 1224; otherwise, processing may flow to bock 1222.

At block 1222, a logstore may be created. In some embodiments, creating the logstore may include designate space in memory for the logstore. In at least one embodiment, block 1222 may employ embodiments of block 714 of FIG. 7 to create a logstore.

Process 1200 continues at block 1224, where a parent file associated with the received data may be updated with the received data. In at least one of various embodiments, block 1224 may employ embodiments of block 716 of FIG. 7 to update the parent file with the received data.

After block 1224, process 1200 may return to a calling process to perform other actions.

Figure 13:
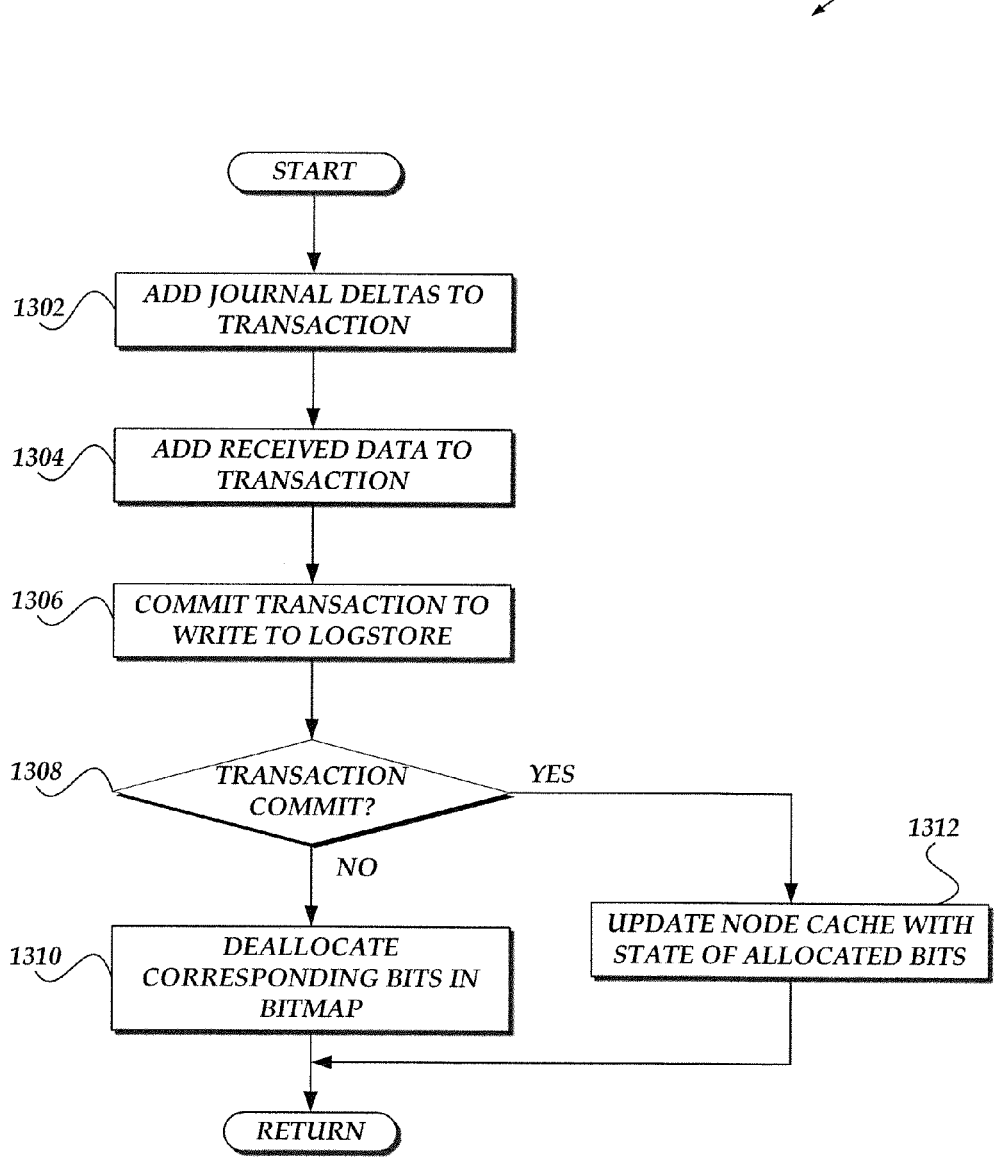
FIG. 13 illustrates a logical flow diagram generally showing one embodiment of a process for storing received data in a logstore.

FIG. 13 illustrates a logical flow diagram generally showing one embodiment of a process for storing received data in a logstore. In some embodiments, process 1300 of FIG. 13 may be implemented by and/or executed on a single network device, such as network device 300 of FIG. 3. In other embodiments, process 1300 or portions of process 1300 of FIG. 13 may be implemented by and/or executed on a cluster, or a plurality of network devices, such as network device 300 of FIG. 3.

Process 1300 begins, after a start block, at block 1302, where journal deltas may be added to a transaction to write received data to a logstore. In some embodiments, the journal deltas may include one or more bits for modifying a bitmap associated with the logstore. In at least one embodiment, each bit associated with the journal deltas may correspond to an allocated bit for writing data to the logstore (e.g., the attached allocated bits described at block 1214 of FIG. 12). In some embodiments, journal deltas may include an XOR delta to enable concurrent, partially ordered, write access to a given block. In at least one embodiment, adding the journal deltas to the transaction may include storing the journal deltas at a coordinator until the transaction is committed to the logstore.

Process 1300 continues at block 1304, where the received data may be added to the transaction. In at least one embodiment, adding the received data to the transaction may include storing the received data at a coordinator until the transaction is committed to the logstore.

Process 1300 then proceeds to block 1306, where the transaction may be committed to write to the logstore. In at least one embodiment, committing the transaction may include obtaining a lock on at least a subset of the logstore. In some embodiments, committing the transaction may include writing at least the received data to one or more data blocks in the logstore in stable storage. In at least one embodiment, the blocks may correspond to the allocated contiguous bits described at block 1208 of FIG. 12.

Continuing to decision block 1308, a determination may be made whether the transaction was committed to the logstore. In some embodiments, the transaction may commit if the received data is successfully stored in the logstore in stable storage. On the contrary, in other embodiments, the transaction may not commit if at least a subset of the received data is not successfully stored in the logstore in stable storage. In some other embodiments, the transaction may not commit if an appropriate lock is not obtained for the logstore. If the transaction did commit, then processing may flow to block 1312; otherwise, processing may flow to block 1310.

At block 1312, the node cache may be updated with a state of the allocated bits that correspond to the logstore blocks where the received data was written. As described above, the received data may be stored in both the node cache and the logstore. In at least one embodiment, the node cache may include a mapping between the received data stored in the node cache and the received data stored in the logstore. In some embodiments, this mapping may include storing a list of the allocated bits that correspond to the logstore blocks where the received data is stored. After block 1312, process 1300 may return to a calling process to perform other actions.

If, at decision block 1308, the transaction did not commit, then processing may flow to block 1310. At block 1310, corresponding bits in the bitmap may be deallocated. In at least one embodiment, each allocated bit associated with the transaction (such as the allocated bits described at block 1208 of FIG. 12) may be deallocated in the bitmap. After block 1310, process 1300 may return to a calling process to perform other actions. In some other embodiments, block 1310 may be optional and process 1310 may loop (not shown) to block 1306 to recommit the transaction to write to the logstore.

Figure 14:
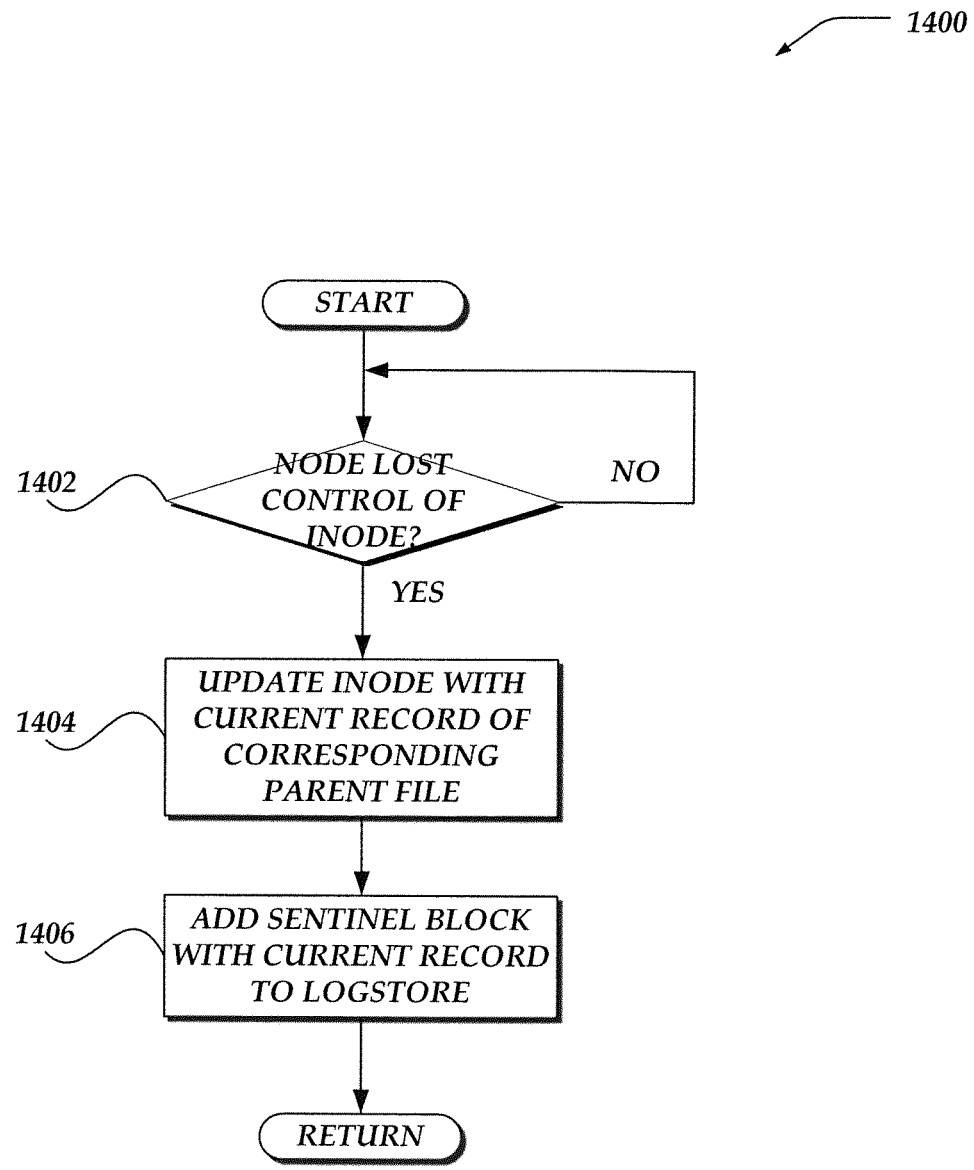
FIG. 14 illustrates a logical flow diagram generally showing one embodiment of a process for storing sentinel blocks within a logstore.

FIG. 14 illustrates a logical flow diagram generally showing one embodiment of a process for storing sentinel blocks within a logstore. In some embodiments, process 1400 of FIG. 14 may be implemented by and/or executed on a single network device, such as network device 300 of FIG. 3. In other embodiments, process 1400 or portions of process 1400 of FIG. 14 may be implemented by and/or executed on a cluster, or a plurality of network devices, such as network device 300 of FIG. 3.

Process 1400 begins, after a start block, at decision block 1402, where a determination may be made whether a node lost control of an inode of a parent file. In at least one of various embodiments, a node may lose control of an inode if a lock for the parent file is stolen by another node, such as is described in FIG. 10. If the node lost control of an inode, then processing may flow to block 1404; otherwise, processing may loop to decision block 1402 until the node loses control of an inode.

At block 1404, the inode may be updated with the current record of the corresponding parent file. In some embodiments, the current record may include, but is not limited to, a size of the parent file, a most recent access time of the parent file, a most recent modified time of the parent file, a current time the inode is changed, or the like. In at least one embodiment, the node that stole the inode from another node may update the inode. In another embodiment, the node losing control of the inode may update the inode before control is lost (i.e., before the node releases the lock on the parent file).

Process 1400 next proceeds to block 1406, where a sentinel block with the current record may be added to a logstore associated with the parent file. In some embodiments, a sentinel block may refer to a block in the logstore that is identified as a sentinel block. In at least one embodiment, the sentinel block may be appended to the logstore. In some embodiments, a sentinel block may indicate that a different node is accessing the logstore than the previous node. In at least one embodiment, the sentinel block may be utilized by a node to recover data from the logstore, such as described below in conjunction with FIGURE. After block 1406, process 1400 may return to a calling process to perform other actions.

Recovery and Flush of Endurant Cache

Figure 15:
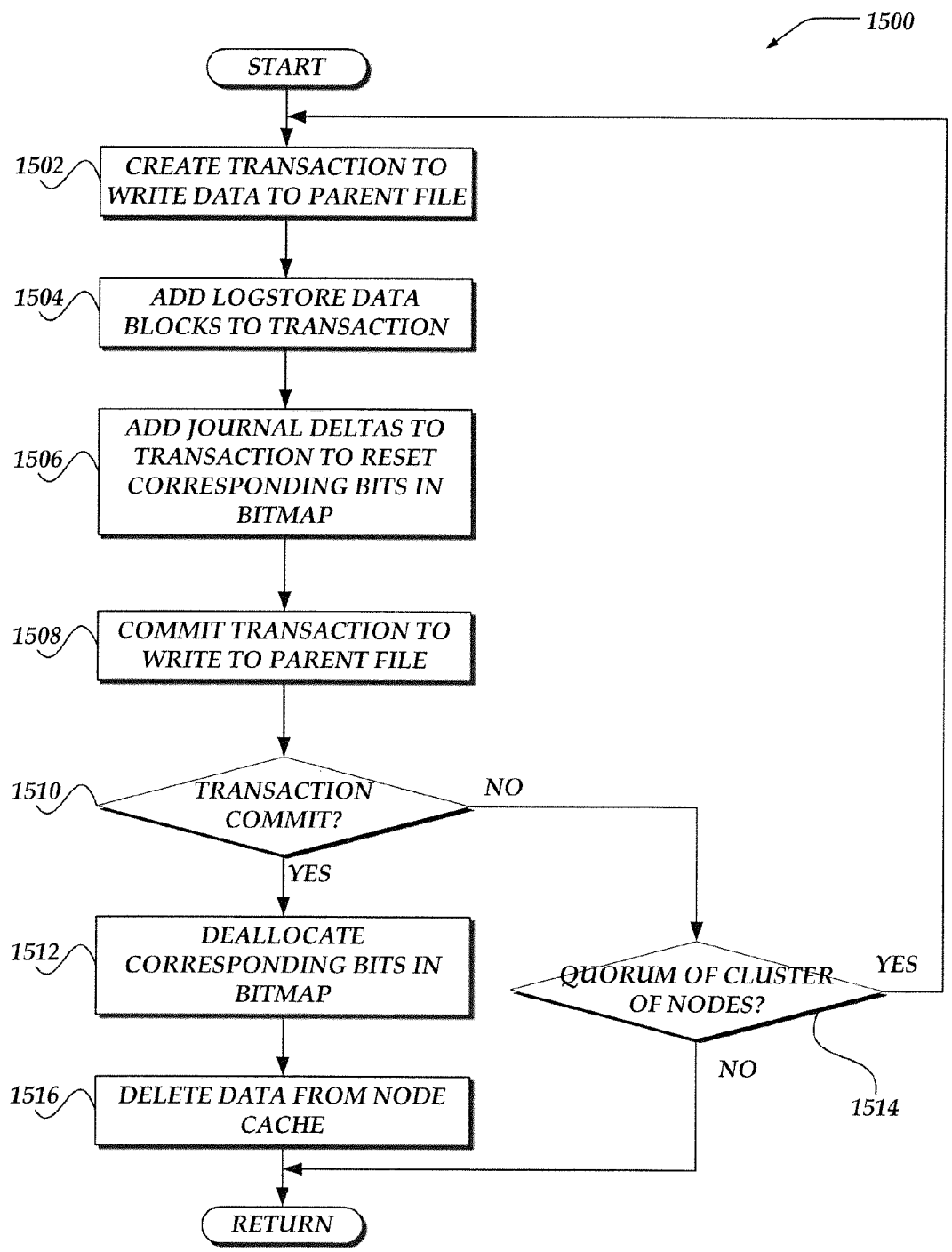
FIG. 15 illustrates a logical flow diagram generally showing one embodiment of a process for recovering and flushing a data from a logstore to a parent file.

The operation of certain aspects of the invention will now be described with respect to FIGS. 15-17. FIG. 15 illustrates a logical flow diagram generally showing one embodiment of a process for recovering and flushing a data from a logstore to a parent file. In some embodiments, process 1500 of FIG. 15 may be implemented by and/or executed on a single network device, such as network device 300 of FIG. 3. In other embodiments, process 1500 or portions of process 1500 of FIG. 15 may be implemented by and/or executed on a cluster, or a plurality of network devices, such as network device 300 of FIG. 3.

Process 1500 begins, after a start block, at block 1502, where a transaction to write data to a parent file may be created. In at least one embodiment, the transaction may include a two-phase commit process, which may enable logstore data to be written to a parent file. In some embodiments, the transaction may include utilizing a coordinator (e.g., a coordinator node) to facilitate writing logstore data to the parent file.

Process 1502 next proceeds to block 1504, where logstore data blocks may be added to the transaction. In at least one embodiment, adding the logstore data blocks to the transaction may include reading data from each logstore data block. In some embodiments, the logstore data blocks may be stored by the coordinator until the transaction is committed to the parent file. In at least one embodiment, reading the logstore data blocks may include embodiments as described in more detail below in conjunction with FIG. 16.

Continuing to block 1506, journal deltas may be added to the transaction to reset corresponding bits in the bitmap of the logstore. In at least one embodiment, adding the journal deltas to the transaction may include storing the journal deltas at a coordinator until the transaction is committed to the parent file.

Process 1500 proceeds to block 1508, where the transaction may be committed to write to the parent file. In at least one embodiment, committing the transaction may include obtaining a lock on at least a subset of the parent file. In some embodiments, committing the transaction may include writing at least data from the logstore to the associated parent file in stable storage.

Continuing to decision block 1510, a determination may be made whether the transaction was committed to the parent file. In some embodiments, the transaction may commit if logstore data is successfully stored in the parent file in stable storage. On the contrary, in other embodiments, the transaction may not commit if at least a subset of the logstore data is not successfully storing in the parent file in stable storage. In some other embodiments, the transaction may not commit if an appropriate lock is not obtained for the parent file. If the transaction committed, then processing may flow to block 1512; otherwise, processing may flow to decision block 1514.

At block 1512, corresponding bits in the bitmap may be deallocated. In at least one of various embodiments, block 1512 may employ embodiments of block 1310 to deallocate bits in the bitmap.

Process 1500 next proceeds to block 1516, where data from the node cache may be deleted. In at least one embodiment, block 1516 may employ embodiments of block 709 of FIG. 7 to delete/purge data from the node cache. In some embodiments, the data deleted from the node cache may correspond to the data stored in the parent file. In at least one of various embodiments, the data may be deleted from the node cached based on a mapping between the node cache data and the logstore data. After block 1516, process 1500 may return to a calling process to perform other actions.

If, at decision block 1510, the transaction did not commit, then processing may flow to decision block 1514. At decision block 1514, a determination may be made whether the cluster of nodes has a quorum. In at least one embodiment, decision block 1514 may employ embodiments of block 903 of FIG. 9 to determine whether the cluster of nodes has a quorum. If the cluster of nodes has a quorum, then processing may loop to block 1502 to create another transaction to write the data to the parent file. If the cluster of nodes does not have a quorum, then processing may return to a calling process to perform other actions.

Figure 16:
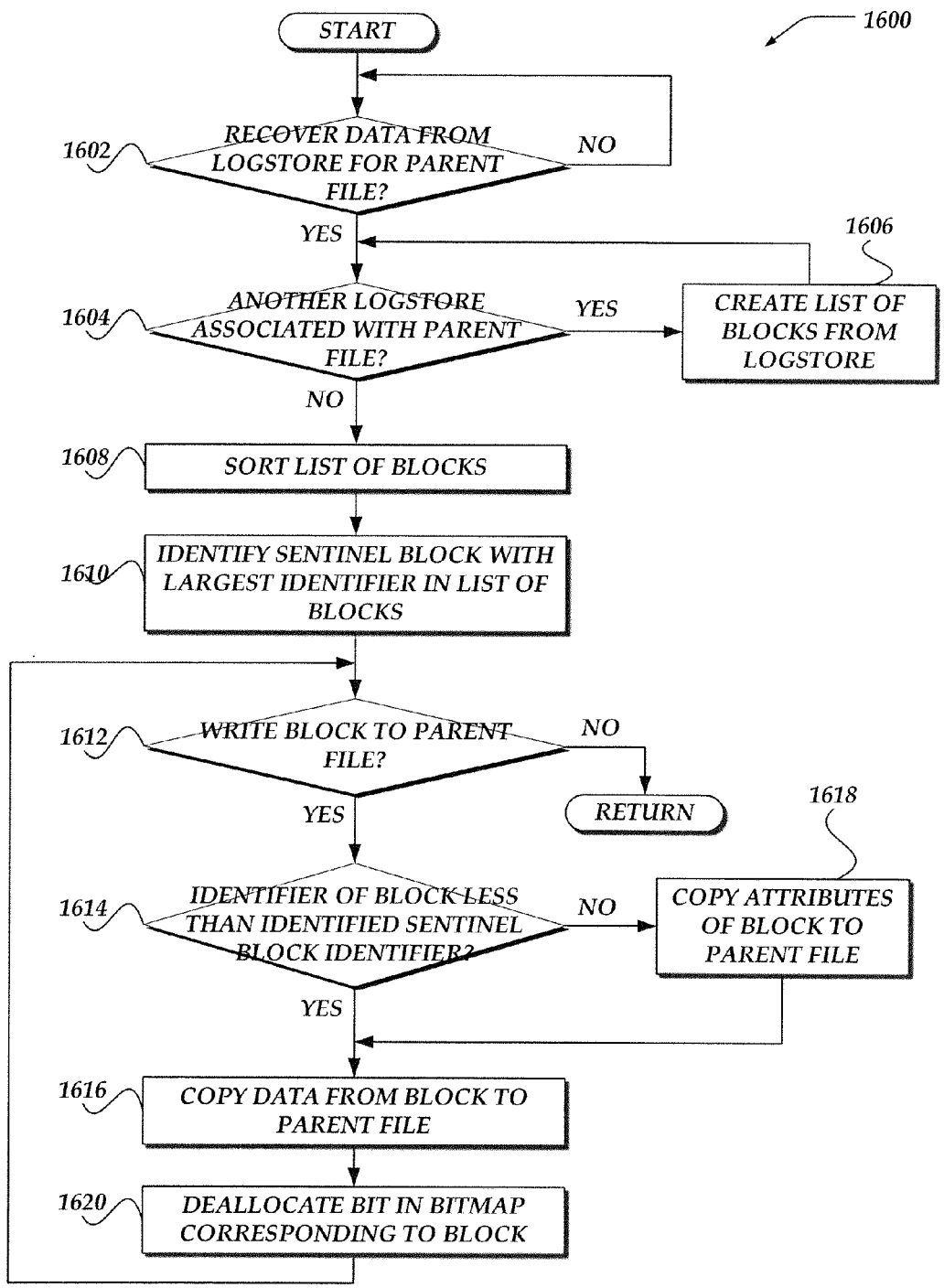
FIG. 16 illustrates a logical flow diagram generally showing one embodiment of a process for recovering data from a logstore to a parent file.

FIG. 16 illustrates a logical flow diagram generally showing one embodiment of a process for recovering data from a logstore to a parent file. In some embodiments, process 1600 of FIG. 16 may be implemented by and/or executed on a single network device, such as network device 300 of FIG. 3. In other embodiments, process 1600 or portions of process 1600 of FIG. 16 may be implemented by and/or executed on a cluster, or a plurality of network devices, such as network device 300 of FIG. 3.

Process 1600 begins, after a start block, at decision block 1602, where a determination may be made whether data may be recovered from one or more logstores for a parent file. In at least one embodiment, data may be recovered from a logstore if a recovery condition occurs. In various embodiments, the recovery condition may be based on a characteristic of the logstore, characteristic of data within the logstore, or the like, or any combination thereof.

In some embodiments, data may be recovered from a logstore if the logstore becomes stale (such as described in at least one embodiment by process 800 of FIG. 8). In other embodiments, data may be recovered from a logstore if the logstore becomes full. In at least one embodiment, a logstore may be full if each designated block of the logstore contains received data. In another embodiment, a logstore may be full is a predetermined amount of data is store in the logstore. In yet other embodiments, data may be recovered from a logstore at predetermined times, periodic time intervals, or the like. In at least one embodiment, data may be recovered from a logstore if received data is maintained in a logstore for a predetermined amount of time.

If data is to be recovered for the parent file, then processing may flow to decision block 1604; otherwise, processing may loop to decision block 1602 to wait to recover data for the parent file.

At decision block 1604, a determination may be made whether there is another logstore associated with the parent file. In some embodiments, block 1604 may include identifying each logstore associated with the parent file. In one such embodiment, one or more of the identified logstores may be selected for processing by block 1606. In at least one embodiment, each of a plurality of logstores may be collected into a logfile, which may be utilized by block 1606 to create a list of block entries from each logstore. If another logstore is associated with the parent file, then processing may flow to block 1606; otherwise, processing may flow to block 1608. If no logstores are associated with the parent file, then processing may return (not shown) to a calling process to perform other actions.

At block 1606, a list of blocks may be created from the logstore. The combination of decision block 1604 and 1606 may enable process 1600 to iterate over all logstores associated with a parent file to create an aggregated list of blocks to be written to the parent file.

If, at decision block 1604, there are no other logstores associated with the parent file, then processing may flow to block 1608. At block 1608, the list of blocks may be sorted. In some embodiments, the list of blocks may be sorted based on a create time, modification time, access time, identification number (e.g., entry identifier 1130 of FIG. 11), or the like.

In any event, process 1600 proceeds to block 1610, where a sentinel block with a largest identifier in the list of blocks may be identified. In some embodiments, each block within a logstore (including data blocks and/or sentinel blocks) may include an identifier based on creation time, modification time, access time, or the like. In other embodiments, the identifier may be a numerically increasing identifier (e.g., entry identifier 1130 of FIG. 11) as blocks are filled with received data and/or identified as a sentinel block.

Process 1600 continues at decision block 1612, where a determination may be made whether a block entry may be written to the parent file. In at least one embodiment, one or more blocks may be written in order as determined at block 1608. If the block may be written to the parent file, then processing may flow to decision block 1614; otherwise, processing may return to a calling process to perform other actions.

At decision block 1614, a determination may be made whether an identifier of the block is less than an identifier of the identified sentinel block. In some embodiments, a comparison may be performed between the identifier of the block and the identifier of the identified sentinel block to determine which identifier is greater. If the block identifier is less than the sentinel block identifier, then processing may flow to block 1616; otherwise, processing may flow to block 1618.

At block 1618, attributes of the block may be copied to the parent file. In some embodiments, the attributes may include, but is not limited to, a size of the data written, a snapshot number and/or version of the written data, an access time, a creation time, or the like. Processing may then flow to block 1616.

At block 1616, data from the block may be copied to the parent file. In at least one embodiment, the block may be written to the parent file in stable storage.

Process 1600 next proceeds to block 1620, where a bit in the bitmap that corresponds to the block may be deallocated. In at least one embodiment, block 1620 may employ embodiments of block 1512 of FIG. 15 to deallocate bits in the bitmap. Processing may then loop to decision block 1612 to determine if there is another block to write to the parent file.

Figure 17:
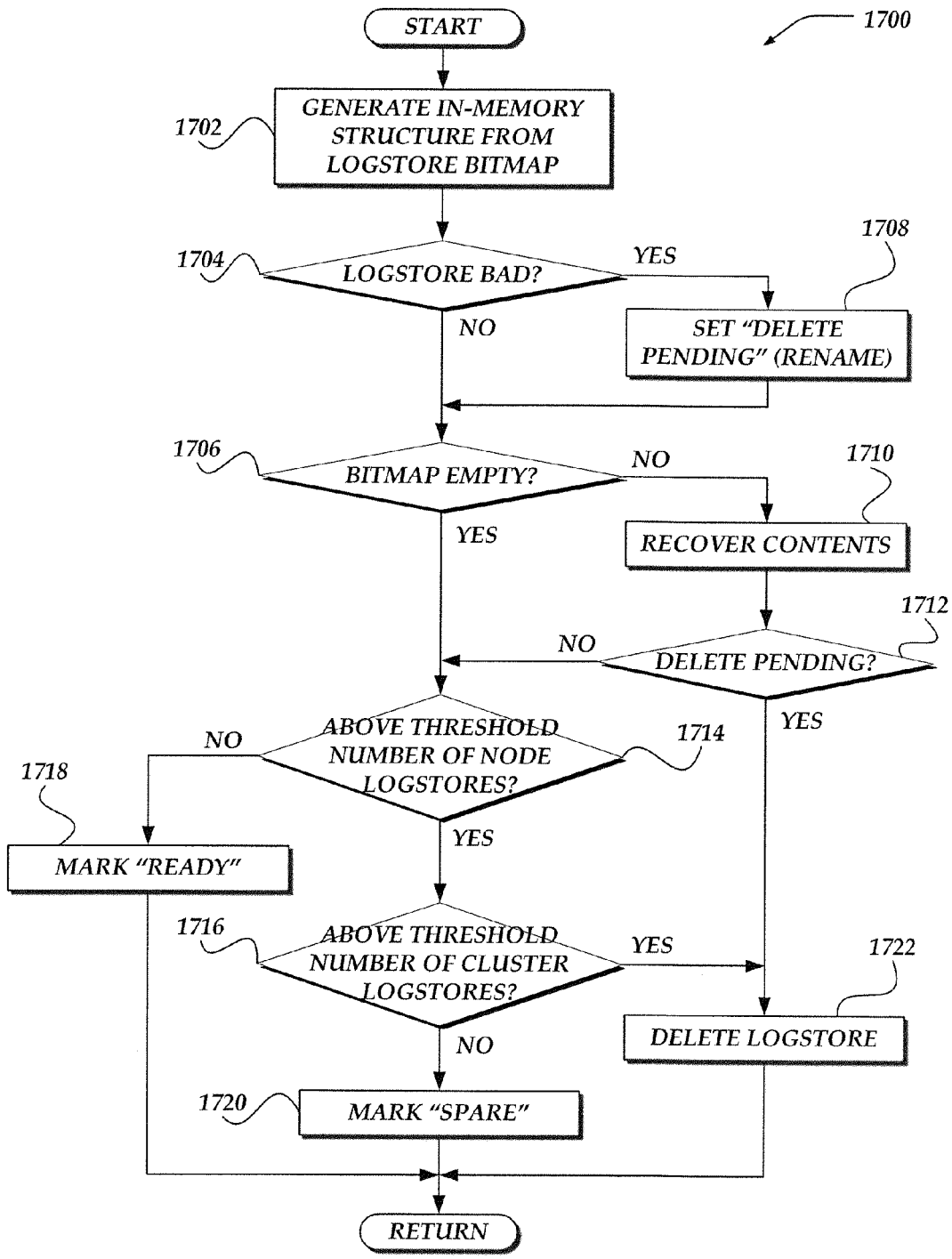
FIG. 17 illustrates a logical flow diagram generally showing one embodiment of a process for managing one or more logstores in a cluster of nodes.

FIG. 17 illustrates a logical flow diagram generally showing one embodiment of a process for managing one or more logstores in a cluster of nodes. In some embodiments, process 1700 of FIG. 17 may be implemented by and/or executed on a single network device, such as network device 300 of FIG. 3. In other embodiments, process 1700 or portions of process 1700 of FIG. 17 may be implemented by and/or executed on a cluster, or a plurality of network devices, such as network device 300 of FIG. 3.

In some embodiments, process 1700 may be performed randomly, at predetermined times, at periodic time intervals, or the like. In at least one embodiment, process 1700 may be performed for each logstore of a cluster of nodes.

Process 1700 begins, after a start block, at block 1702, where an in-memory structure may be generated from a logstore bitmap.

Process 1700 proceeds to decision block 1704, where a determination may be made whether the logstore is bad. In at least one embodiment, a logstore may be bad if the logstore is stale, (such as described in at least one embodiment by process 800 of FIG. 8). If the logstore is bad, then processing may flow to block 1708; otherwise, processing may flow to decision block 1706.

At block 1708, the bad logstore may be set to "delete pending." In some embodiments, setting a logstore to delete pending may include changing a flag or other identifier in a header of the logstore, putting the logstore on a delete queue, or the like. Processing may then flow to decision block 1706.

At decision block 1706, a determination may be made whether the bitmap of the logstore is empty. In at least one embodiment, the bitmap may be empty if all bits in the bitmap are deallocated. If the bitmap is empty, then processing may flow to decision block 1714; otherwise, processing may flow to block 1710.

At block 1710, contents of the logstore may be recovered. In at least one of various embodiments, block 1710 may employ embodiments of process 1500 of FIG. 15 and/or process 1600 of FIG. 16 to recover the contents of the logstore.

Process 1700 proceeds to decision block 1712, where a determination may be made whether the logstore is set to delete pending. If the logstore is set to delete pending, then processing may flow to block 1722; otherwise, processing may flow to decision block 1714.

At decision block 1714, a determination may be made whether a number of logstores for a node is above a threshold. In at least one embodiment, the threshold may be a maximum number of logstores that a node can maintain. In some embodiments, the threshold may be predetermined, based on a number of computing resources available to a node, or the like, or any combination thereof. In some embodiments, each node may have a same threshold. In other embodiments, one or more nodes may have a threshold different than another node. If the number of logstores for the node is above the threshold, then processing may flow to decision block 1716; otherwise, processing may flow to block 1718.

At block 1718, the logstore may be marked as "ready." In some embodiments, marking a logstore as ready may include changing a flag or other identifier in a header of the logstore, putting the logstore on a ready queue, or the like. In at least one embodiment, a logstore marked ready may be later utilized by the node and associated with a same or different parent file than it was previously associated. After block 1718, process 1700 may return to a calling process to perform other actions.

If, at decision block 1714, the number of logstores for the node is above the threshold, then process 1700 may flow to decision block 1716. At decision block 1716, a determination may be made whether a number of logstores for the cluster of nodes is above a threshold. In at least one embodiment, the threshold may be a maximum number of logstores that a cluster can maintain. In some embodiments, the threshold may be predetermined, based on a number of computing resources available to the cluster, or the like, or any combination thereof. If the number of logstores for the cluster is above the threshold, then processing may flow to block 1722; otherwise, processing may flow to block 1720.

At block 1722, the logstore may be deleted. In at least one embodiment, deleting a logstore may include deallocating memory associated with the logstore. After block 1722, process 1700 may return to a calling process to perform other actions.

If, at decision block 1716, the number of logstores for the cluster is not above the threshold, then processing may flow to block 1720. At block 1720, the logstore may be marked as a "spare." In some embodiments, marking a logstore as a spare may include changing a flag or other identifier in a header of the logstore, putting the logstore on a spare queue, or the like. In at least one embodiment, a logstore marked spare may be later utilized by a same node or other nodes in the cluster. After block 1720, process 1700 may return to a calling process to perform other actions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for employing a node device to recover cached data in a cluster of node devices over a network, wherein the node device performs actions, comprising:
    if a recovery condition for the cached data in a logstore occurs, determining recoverable cached data in the logstore that is mirrored in a node cache, wherein the node cache is maintained in a memory of the node device, and wherein the logstore is maintained on a stable storage device accessible to all node devices in the cluster of node devices;
    determining a parent file associated with the logstore, wherein the parent file is stored in a stable storage device;
    writing the recoverable cached data to the parent file in the stable storage device; and
    in response to determining that the recoverable cached data has been committed to the parent file in the stable storage device:
        purging the recoverable cached data from the node cache;
        invalidating the cached data in a block in the logstore that corresponds to the recoverable cached data; and
        deallocating each block in the logstore that includes the invalidated cached data, wherein each deallocated block is available for storage of subsequent cached data.

2. The method of claim 1, wherein deallocating each block further comprises deallocating bits in a bitmap of the logstore, wherein each deallocated bit corresponds to the block in the logstore that included the recoverable cached data.

3. The method of claim 1, wherein determining the parent file further comprises:
    generating a transaction to write the recoverable cached data in the logstore to the parent file and adding the recoverable cached data to the transaction;
    adding journal deltas for each bit in a bitmap that corresponds to the recoverable cached data to the transaction; and
    committing the transaction to write the recoverable cached data to the parent file.

4. The method of claim 1, wherein the recovery condition occurs if at least one of the logstore is stale, the logstore is full, or the cached data is maintained in the logstore for at least a predetermined amount of time.

5. The method of claim 1, wherein determining the recoverable cached data further comprises:
    determining each logstore associated with the parent file; and
    generating a list of blocks from each of the associated logstores, wherein each block includes recoverable cached data to be written to the parent file.

6. The method of claim 1, wherein writing the determined data to the parent file further comprises:
    determining a sentinel block having a largest identifier from a list of blocks in at least one logstore associated with the parent file, wherein the sentinel block indicates that an inode of the parent file is accessed by a different node device; and
    writing to the parent file those attributes of blocks for recoverable cached data having an identifier greater than the sentinel block's identifier.

7. The method of claim 1, further comprising if a number of system logstores is above a maximum threshold, deleting the logstore.

8. A node device for recovering cached data in a cluster of node devices over a network, comprising:
    a memory for storing data and instructions;
    a processor that executes the instructions to enable actions, including:
        if a recovery condition for the cached data in a logstore occurs, determining recoverable cached data in the logstore that is mirrored in a node cache, wherein the node cache is maintained in a memory of the node device, and wherein the logstore is maintained on a stable storage device accessible to all node devices in the cluster of node devices;
        determining a parent file associated with the logstore, wherein the parent file is stored in a stable storage device;
        writing the recoverable cached data to the parent file in the stable storage device; and in response to determining that the recoverable cached data has been committed to the parent file in the stable stage device:
   purging the recover cached data form the node;
   invalidating the cached data in a block in the logstore that corresponds to the recoverable cached data; and
   deallocating each block in the logstore that includes the invalidated cached data, wherein each deallocated block is available for storage of subsequent cached data.

9. The network device of claim 8, wherein deallocating each block further comprises deallocating bits in a bitmap of the logstore, wherein each deallocated bit corresponds to the block in the logstore that included the recoverable cached data.

10. The network device of claim 8, wherein determining the parent file further comprises:
   generating a transaction to write the recoverable cached data in the logstore to the parent file and adding the recoverable cached data to the transaction;
   adding journal deltas for each bit in a bitmap that corresponds to the recoverable cached data to the transaction; and
   committing the transaction to write the recoverable cached data to the parent file.

11. The network device of claim 8, wherein the recovery condition occurs if at least one of the logstore is stale, the logstore is full, or the cached data is maintained in the logstore for at least a predetermined amount of time.

12. The network device of claim 8, wherein determining the recoverable cached data further comprises:
   determining each logstore associated with the parent file; and
   generating a list of blocks from each of the associated logstores, wherein each block includes recoverable cached data to be written to the parent file.

13. The network device of claim 8, wherein writing the determined data to the parent file further comprises:
   determining a sentinel block having a largest identifier from a list of blocks in at least one logstore associated with the parent file, wherein the sentinel block indicates that an inode of the parent file is accessed by a different node device; and
   writing to the parent file those attributes of blocks for recoverable cached data having an identifier greater than the sentinel block's identifier.

14. The network device of claim 8, further comprising if a number of system logstores is above a maximum threshold, deleting the logstore.

15. A system for recovering cached data in a cluster of node devices over a network, comprising:
   a cluster of node devices that are arranged to access data that is stored in a parent file on a stable storage device; and
   a node device, including:
      a memory for storing data and instructions;
      a processor that executes the instructions to enable actions, including:
         if a recovery condition for the cached data in a logstore occurs, determining recoverable cached data in the logstore that is mirrored in a node cache, wherein the node cache is maintained in a memory of the node device, and wherein the logstore is maintained on a stable storage device accessible to all node devices in the cluster of node devices;
         determining a parent file associated with the logstore, wherein the parent file is stored in a stable storage device;
         writing the recoverable cached data to the parent file in the stable storage device; and
         in response to determining that the recoverable cached data has been committed to the parent file in the stable storage device:
            purging the recoverable cached data from the node cache;
            invalidating the cached data in a block in the logstore that corresponds to the recoverable cached data; and
            deallocating each block in the logstore that includes the invalidated cached data, wherein each deallocated block is available for storage of subsequent cached data.

16. The system of claim 15, wherein deallocating each block further comprises deallocating bits in a bitmap of the logstore, wherein each deallocated bit corresponds to the block in the logstore that included the recoverable cached data.

17. The system of claim 15, wherein determining the parent file further comprises:
   generating a transaction to write the recoverable cached data in the logstore to the parent file and adding the recoverable cached data to the transaction;
   adding journal deltas for each bit in a bitmap that corresponds to the recoverable cached data to the transaction; and
   committing the transaction to write the recoverable cached data to the parent file.

18. The system of claim 15, wherein the recovery condition occurs if at least one of the logstore is stale, the logstore is full, or the cached data is maintained in the logstore for at least a predetermined amount of time.

19. The system of claim 15, wherein determining the recoverable cached data further comprises:
   determining each logstore associated with the parent file; and
   generating a list of blocks from each of the associated logstores, wherein each block includes recoverable cached data to be written to the parent file.

20. The system of claim 15, wherein writing the determined data to the parent file further comprises:
   determining a sentinel block having a largest identifier from a list of blocks in at least one logstore associated with the parent file, wherein the sentinel block indicates that an inode of the parent file is accessed by a different node device; and
   writing to the parent file those attributes of blocks for recoverable cached data having an identifier greater than the sentinel block's identifier.

21. The system of claim 15, further comprising if a number of system logstores is above a maximum threshold, deleting the logstore.

22. A non-transitory processor readable storage media that includes instructions, which are arranged to be executed by a processor to perform actions, the actions comprising:
   if a recovery condition for the cached data in a logstore occurs, determining recoverable cached data in the logstore that is mirrored in a node cache, wherein the node cache is maintained in a memory of a node device, and wherein the logstore is maintained on a stable storage device accessible to node devices in a cluster of node devices;

determining a parent file associated with the logstore, wherein the parent file is stored in a stable storage device;

writing the recoverable cached data to the parent file in the stable storage device; and in response to determining that the recoverable cached data has been committed to the parent file in the stable storage device:

purging the recoverable cached data from the node cache;

invalidating the cached data in a block in the logstore that corresponds to the recoverable cached data; and deallocating each block in the logstore that includes the invalidated cached data, wherein each deallocated block is available for storage of subsequent cached data.

23. The media of claim 22, wherein deallocating each block further comprises deallocating bits in a bitmap of the logstore, wherein each deallocated bit corresponds to the block in the logstore that included the recoverable cached data.

24. The media of claim 22, wherein determining the parent file further comprises:

generating a transaction to write the recoverable cached data in the logstore to the parent file and adding the recoverable cached data to the transaction;

adding journal deltas for each bit in a bitmap that corresponds to the recoverable cached data to the transaction; and committing the transaction to write the recoverable cached data to the parent file.

25. The media of claim 22, wherein the recovery condition occurs if at least one of the logstore is stale, the logstore is full, or the cached data is maintained in the logstore for at least a predetermined amount of time.

26. The media of claim 22, wherein determining the recoverable cached data further comprises:

determining each logstore associated with the parent file; and generating a list of blocks from each of the associated logstores, wherein each block includes recoverable cached data to be written to the parent file.

27. The media of claim 22, wherein writing the determined data to the parent file further comprises:

determining a sentinel block having a largest identifier from a list of blocks in at least one logstore associated with the parent file, wherein the sentinel block indicates that an inode of the parent file is accessed by a different node device; and writing to the parent file those attributes of blocks for recoverable cached data having an identifier greater than the sentinel block's identifier.

28. The media of claim 22, further comprising if a number of system logstores is above a maximum threshold, deleting the logstore.

* * * * *